(12) United States Patent
Itogawa

(10) Patent No.: US 11,593,040 B2
(45) Date of Patent: Feb. 28, 2023

(54) IMAGE FORMING APPARATUS, IMAGE FORMING SYSTEM, AND COMPUTER-READABLE MEDIUM FOR ADDING TARGET DATA TO OBTAINED DATA

(71) Applicant: BROTHER KOGYO KABUSHIKI KAISHA, Nagoya (JP)

(72) Inventor: Yoshihiro Itogawa, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/411,481

(22) Filed: Aug. 25, 2021

(65) Prior Publication Data

US 2022/0066708 A1    Mar. 3, 2022

(30) Foreign Application Priority Data

Aug. 31, 2020    (JP) .............................. JP2020-145343

(51) Int. Cl.
    *G06F 3/12*    (2006.01)
(52) U.S. Cl.
    CPC .......... *G06F 3/1206* (2013.01); *G06F 3/1248* (2013.01); *G06F 3/1275* (2013.01)
(58) Field of Classification Search
    CPC .... G06F 3/1206; G06F 3/1248; G06F 3/1275; G06F 3/1209; G06F 3/1285
    See application file for complete search history.

(56) References Cited

U.S. PATENT DOCUMENTS

| | | | | |
|---|---|---|---|---|
| 2003/0189718 A1* | 10/2003 | Yamamura | ............ | G06F 3/1204 358/1.18 |
| 2005/0073281 A1* | 4/2005 | Kerlin, IV | ................ | H02P 6/32 318/749 |
| 2005/0076281 A1* | 4/2005 | Kojima | ............... | G06F 11/0733 714/736 |
| 2007/0028061 A1* | 2/2007 | Takehana | ........... | H04N 1/00127 714/E11.138 |
| 2007/0229877 A1* | 10/2007 | Shima | ................ | G06K 15/1822 358/1.14 |
| 2010/0245899 A1* | 9/2010 | Hirama | ................. | G06F 3/1284 358/1.15 |
| 2022/0066713 A1* | 3/2022 | Itogawa | ............. | G06K 15/1814 |
| 2022/0066714 A1* | 3/2022 | Itogawa | ............. | G06K 15/1814 |

FOREIGN PATENT DOCUMENTS

JP    2018-171757 A    11/2018

* cited by examiner

*Primary Examiner* — Huo Long Chen
(74) *Attorney, Agent, or Firm* — Scully, Scott, Murphy & Presser, P.C.

(57) ABSTRACT

An image forming apparatus includes a controller configured to obtain PJL data via a data interface, and add target PJL data to the obtained PJL data with reference to filter data stored in a non-volatile memory. The target PJL data is PJL data intended for causing the image forming apparatus to perform a particular process. The filter data includes data for adding the target PJL data to the obtained PJL data.

19 Claims, 16 Drawing Sheets

Conversion Modes 1-4

| Conversion Mode | Conversion Target | Indispensable/Omittable/Unnecessary in Conversion Rule Setting for Each Section of PJL Data | | | Related Rule |
|---|---|---|---|---|---|
| | | Command | Command modifier Value | Option name Value | |
| 1 | Command | Indispensable | Unnecessary | Unnecessary | Skip to 100th line |
| 2 | Option name | Omittable | Omittable | Indispensable | Skip to 299th line |
| 3 | PJL data deletion | Omittable | Omittable | Omittable | |
| 4 | PJL data addition | Indispensable | Omittable | Indispensable | |

Conversion Mode 1

| | Conversion Rule | Pre-Conversion PJL Data | Post-Conversion PJL Data |
|---|---|---|---|
| Example 1 | UNKNOWNINIT → INITIALIZE | @PJL UNKNOWNINIT | @PJL INITIALIZE |
| Example 2 | UNKNOWNJOB → JOB | @PJL UNKNOWNJOB | @PJL JOB |

FIG. 4A

Conversion Mode 2

| | Conversion Rule | Pre-Conversion PJL Data | Post-Conversion PJL Data |
|---|---|---|---|
| Example 1 | [G][M]MEDIASIZE → [G][M]PAPER | @PJL INQUIRE MEDIASIZE | @PJL INQUIRE PAPER |
| Example 2 | INQUIRE[M]MEDIASIZE → INQUIRE[M]PAPER | @PJL INQUIRE LPARM PCL MEDIASIZE | @PJL INQUIRE LPARM PCL PAPER |
| Example 3 | SET LPARM PCL MEDIASIZE=LETTER → SET LPARM PCL PAPER=LETTER | @PJL SET LPARM PCL MEDIASIZE=LETTER | @PJL SET LPARM PCL PAPER=LETTER |

| A | B F.H | C G.I | Pre-Conversion PJL Data | D | E | Post-Conversion PJL Data | | | | | | | | | | | | | | | |
|---|---|---|---|---|---|---|---|---|---|---|---|---|---|---|---|---|---|---|---|---|---|
| 1 | 1 | 1 | UNKNOWNMT | 1 | 1 | INITIALIZE | | | | | | | | | | | | | | | |
| 2 | 1 | 1 | UNKNOWJOB | 1 | 1 | JOB | | | | | | | | | | | | | | | |
| 3 | 1 | 2 | SET LPARM PJL | 1 | 2 | SET | MEDIASIZE | LETTER | LETTER | 1 | 2 | SET | LPARM | PCL | PAPER | LETTER | LETTER | 4, 7 | | | |
| 4 | 1 | 2 | DEFAULT LPARM PCL | 1 | 2 | MEDIASIZE | PAPER | LETTER | | 1 | 2 | SET | LPARM | PCL | PAPER | LETTER | | | | | |
| 5 | 2 | 2 | SET N/A | 1 | 2 | MEDIATYPE | STAPLE | ON | | 2 | 2 | N/A | N/A | MEDIAWEIGHT | HEAVY | 1 | 2 | SET | N/A | N/A | MEDIATYPE THICK ON |
| 6 | 1 | 2 | SET N/A | 1 | 2 | N/A | N/A | | | 2 | 2 | SET | N/A | N/A | OUTBIN | FINISHER | 2 | SET | N/A | N/A | STAPLE |
| 7 | 1 | 2 | N/A N/A | 1 | 2 | MEDIASIZE | N/A | | | 2 | 2 | N/A | N/A | N/A | PAPER | N/A | | | | | |
| 8 | 1 | 3 | SET N/A | 1 | 2 | MEDIACOLOR | N/A | | | | | | | | | | | | | | |
| 9 | 1 | 1 | N/A N/A | 1 | 2 | DUPLEX | ON | | | | | | | | | | | | | | |
| 10 | 2 | 4 | UNKNOWNMT | 1 | 1 | REBOOT | 1 | 1 | INITIALIZE | | | | | | | | | | | | |

| | Pre-Conversion PJL Data | Post-Conversion PJL Data |
|---|---|---|
| R1 | SET ORGTRAY=1 | SET TRAY=STD |
| R2 | ORGTRAY | TRAY |

| | Pre-Conversion PJL Data | Post-Conversion PJL Data |
|---|---|---|
| R1 | ORGTRAY | TRAY |
| R2 | SET ORGTRAY=1 | SET TRAY=STD |

FIG. 6A
※1

| A | B | C | Pre-Conversion PJL Data | D | E | Post-Conversion PJL Data |
|---|---|---|---|---|---|---|
| 1 | 1 | 1 | UNKNOWNSET | 1 | 1 | INITIALIZE |

FIG. 6B
※2

| A | B | C | Pre-Conversion PJL Data | | | D | E | Post-Conversion PJL Data | | | Related Rule |
|---|---|---|---|---|---|---|---|---|---|---|---|
| 3 | 1 | 2 | SET | LPARM | PCL | MEDIASIZE | LETTER | 1 | 2 | SET | LPARM | PCL | PAPER | LETTER | 4, 7 |

FIG. 6C
※3

| A | B | C1 | Pre-Conversion PJL Data 1 | | | | D | E | Post-Conversion PJL Data 2 | | | |
|---|---|---|---|---|---|---|---|---|---|---|---|---|
| 5 | 2 | 2 | SET | N/A | N/A | MEDIATYPE | PAPER | 1 | 2 | SET | N/A | N/A | MEDIAWEIGHT | HEAVY |

FIG. 6D
※4

| A | B | C | Pre-Conversion PJL Data 1 | | | | D | E1 | Post-Conversion PJL Data 1 | | | |
|---|---|---|---|---|---|---|---|---|---|---|---|---|
| 6 | 1 | 2 | SET | N/A | N/A | STAPLE | ON | 2 | 2 | SET | N/A | N/A | FINISHER | CUTBIN |

FIG. 6E
※5

| A | F | G | Pre-Conversion PJL Data to be Deleted | | | |
|---|---|---|---|---|---|---|
| 8 | 1 | 3 | N/A | N/A | N/A | MEDIACOLOR | N/A |

FIG. 6F
※6

| A | H | 1 | Additional Post-Conversion PJL Data | | | |
|---|---|---|---|---|---|---|
| 9 | 1 | 4 | SET | N/A | N/A | DUPLEX | ON |

A: Conversion Rule Number
B: Number of Pre-Conversion PJL Data
C: Conversion Mode (Before_Conversion)
C1: Conversion Mode (Before_Conversion 1)
C2: Conversion Mode (Before_Conversion 2)
D: Number of Post-Conversion PJL Data
E: Conversion Mode (After_Conversion)
E1: Conversion Mode (After_Conversion 1)
E2: Conversion Mode (After_Conversion 2)
F: Number of Pre-Conversion PJL Data to be Deleted
G: Conversion Mode (Deletion Mode)
H: Number of Post-Conversion PJL Data to be Added
I: Conversion Mode (Addition Mode)

IMAGE FORMING APPARATUS, IMAGE FORMING SYSTEM, AND COMPUTER-READABLE MEDIUM FOR ADDING TARGET DATA TO OBTAINED DATA

CROSS-REFERENCE TO RELATED APPLICATION

This application claims priority under 35 U.S.C. § 119 from Japanese Patent Application No. 2020-145343 filed on Aug. 31, 2020. The entire subject matter of the application is incorporated herein by reference.

BACKGROUND

Technical Field

Aspects of the present disclosure are related to an image forming apparatus, an image forming system, and a non-transitory computer-readable medium, for processing data described in a PJL ("PJL" is an abbreviation for "Printer Job Language").

Related Art

An image forming apparatus has been known that is configured to store new PJL data sent from a PC, which is not registered in a PJL dictionary, into the PJL dictionary in association with a corresponding process, and when receiving the said new PJL data from the PC, perform the corresponding process registered in the PJL dictionary in association with the received new PJL data.

SUMMARY

Image forming apparatuses such as printers are changing with diversification of their provided values as well as improvements in their performance and functions. However, in an image forming system including such an image forming apparatus, if the image forming apparatus is updated to address the above changes, it causes an increased burden required for reconstructing the image forming system.

Aspects of the present disclosure are advantageous to provide one or more improved techniques to suppress a burden required for reconstructing an image forming system from being increased even though an image forming apparatus included in the image forming system is updated.

According to aspects of the present disclosure, an image forming apparatus is provided, which includes a data interface, a non-volatile memory, and a controller. The controller is configured to obtain PJL data via the data interface, and add target PJL data to the obtained PJL data with reference to filter data stored in the non-volatile memory. The target PJL data is PJL data intended for causing the image forming apparatus to perform a particular process. The filter data includes data for adding the target PJL data to the obtained PJL data.

According to aspects of the present disclosure, further provided is an image forming system that includes an information processing device and an image forming apparatus. The image forming apparatus includes a data interface, a non-volatile memory, and a controller. The controller is configured to obtain PJL data via the data interface, and add target PJL data to the obtained PJL data with reference to filter data stored in the non-volatile memory. The target PJL data is PJL data intended for causing the image forming apparatus to perform a particular process. The filter data includes data for adding the target PJL data to the obtained PJL data.

According to aspects of the present disclosure, further provided is a non-transitory computer-readable medium storing computer-readable instructions executable by a processor of an image forming apparatus including a data interface and a non-volatile memory. The instructions are configured to, when executed by the processor, cause the image forming apparatus to obtain PJL data via the data interface, and add target PJL data to the obtained PJL data with reference to filter data stored in the non-volatile memory. The target PJL data is PJL data intended for causing the image forming apparatus to perform a particular process. The filter data includes data for adding the target PJL data to the obtained PJL data.

BRIEF DESCRIPTION OF THE ACCOMPANYING DRAWINGS

FIG. 3 is an illustration for conversion modes in the illustrative embodiment according to one or more aspects of the present disclosure.

FIG. 4A is an illustration for Conversion Mode 1 in the illustrative embodiment according to one or more aspects of the present disclosure.

FIG. 4B is an illustration for Conversion Mode 2 in the illustrative embodiment according to one or more aspects of the present disclosure.

FIG. 5A is an illustration showing an example of filter data in the illustrative embodiment according to one or more aspects of the present disclosure.

FIG. 5B is an illustration showing an example of recommended filter data in the illustrative embodiment according to one or more aspects of the present disclosure.

FIG. 5C is an illustration showing an example of unrecommended filter data in the illustrative embodiment according to one or more aspects of the present disclosure.

FIG. 6A is an illustration showing an example of a conversion rule for converting PJL data, to which Conversion Mode 1 is applied, in the illustrative embodiment according to one or more aspects of the present disclosure.

FIGS. 6B to 6D are illustrations showing examples of conversion rules to which Conversion Mode 2 is applied, in the illustrative embodiment according to one or more aspects of the present disclosure.

FIG. 6E is an illustration showing an example of a conversion rule to which Conversion Mode 3 is applied, in the illustrative embodiment according to one or more aspects of the present disclosure.

FIG. 6F is an illustration showing an example of a conversion rule to which Conversion Mode 4 is applied, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
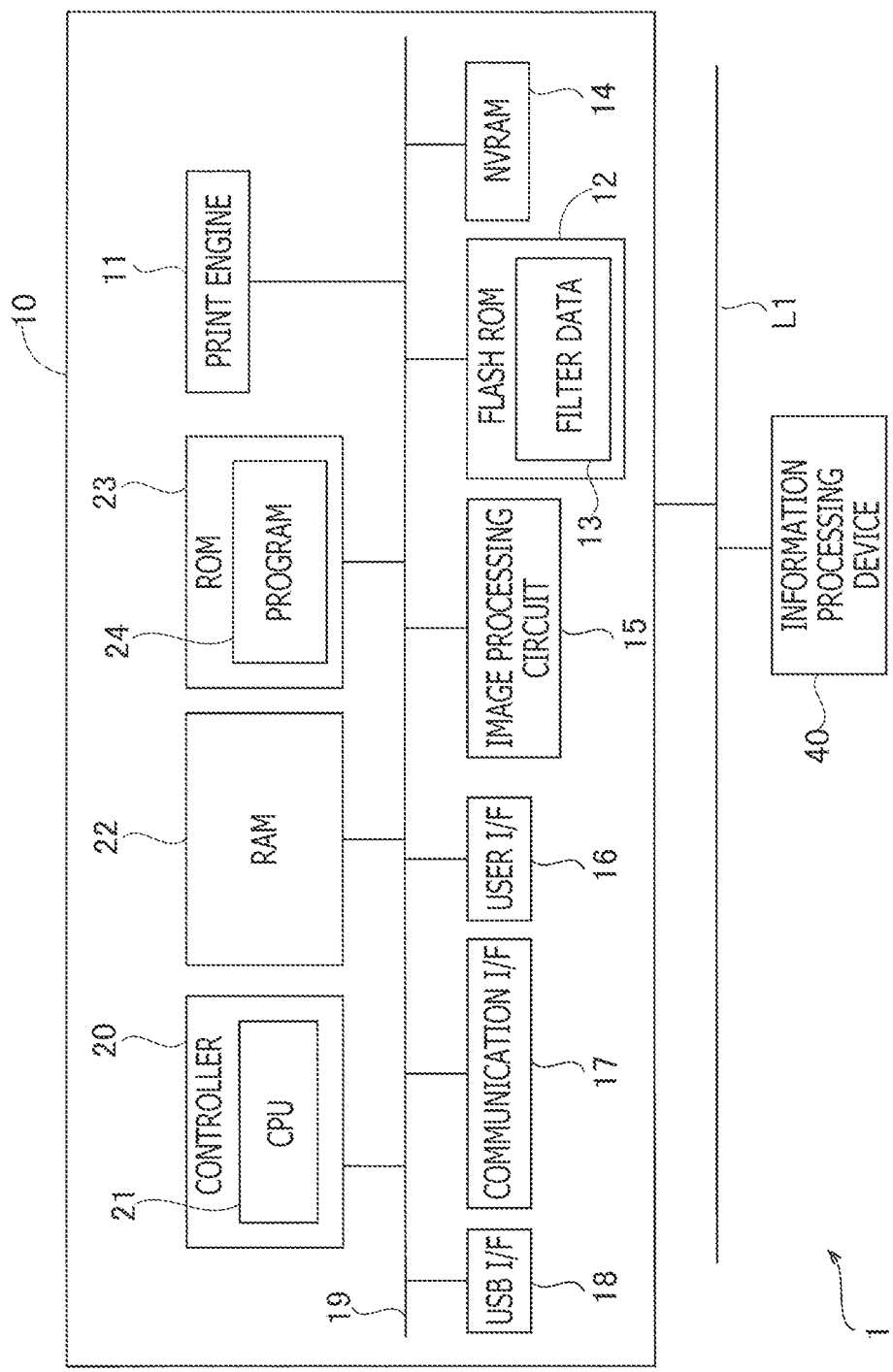
FIG. 1 is a block diagram showing an electrical configuration of an image forming apparatus in an illustrative embodiment according to one or more aspects of the present disclosure.

Hereinafter, an illustrative embodiment according to aspects of the present disclosure will be described with reference to the accompanying drawings. FIG. 1 schematically shows an electrical configuration of an image forming system 1 including an image forming apparatus 10 and an information processing device 40 in the illustrative embodiment. The image forming apparatus 10 includes a print engine 11, a flash ROM 12, an NVRAM 14, an image processing circuit 15, a user I/F ("I/F" is an abbreviation for "interface") 16, a communication I/F 17, a USB I/F 18, a bus 19, a controller 20, a RAM 22, and a ROM 23.

The print engine 11 is configured to print an image on a recording medium such as a sheet in a particular printing method. Examples of the particular printing method may include, but are not limited to, an electrophotographic method, an inkjet method, and a thermal method. The image processing circuit 15 is configured to perform RIP ("RIP" is an abbreviation for "Raster Image Processor") processing for image data pertaining to a PDL section 32 (see FIG. 2A) and convert the image data into drawing data corresponding to pixels to be formed on a recording medium such as a sheet. The drawing data obtained through the conversion is sent to the print engine 11. The NVRAM 14 is a non-volatile memory configured to store various types of data and information such as print setting information.

The user I/F 16 may include a touch panel. The user I/F 16 is configured to display messages and receive user operations. The communication I/F 17 is communicably connected with the information processing device 40 via a LAN L1. A communication protocol such as Bluetooth (registered trademark) may be used as a communication method between the image forming apparatus 10 and the information processing device 40. Examples of the information processing device 40 may include, but are not limited to, a PC and a smartphone. The USB I/F 18 is hardware for communicating with devices connected based on USB standards.

The controller 20 includes a CPU 21. The controller 20 controls the print engine 11 in accordance with the print setting information stored in the NVRAM 14. In addition, the control unit 20 controls communication with the information processing device 40 via the communication I/F 17. The flash ROM 12 stores filter data 13. The filter data 13 contains description of conversion rules for converting PJL data transmitted by the information processing device 40 into PJL data executable by the image forming apparatus 10. The filter data 13 may be stored in a storage medium such as USB memory, and may be supplied from such a storage medium to the image forming apparatus 10. The filter data 13 will be described in detail later.

The ROM 23 stores program 24 executable by the CPU 21. The RAM 22 has a storage area to develop the filter data 13 read from the flash ROM 12, and a work area to develop the program 24 read from the ROM 23. The controller 20, the RAM 22, the ROM 23, the flash ROM 12, the NVRAM 14, the print engine 11, the image processing circuit 15, the user I/F 16, the communication I/F 17, and the USB I/F 18 are interconnected via the bus 19. It is noted that the controller 20 may include, as well as the CPU 21, the ROM 23 storing the program 24. In other words, the controller 20 may be configured to execute the program 24 by the CPU 21, thereby controlling operations by the image forming apparatus 10.

The program 24 and the filter data 13 may be stored in a non-transitory computer-readable storage medium, supplied from such a storage medium to the image forming apparatus 10, and executed by the CPU 21. Examples of the non-transitory computer-readable storage medium may include, but are not limited to, recording media such as CD-ROMs, DVD-ROMs, and USB memories as well as the aforementioned various storages. The non-transitory computer-readable storage medium is also a tangible medium. On the other hand, an electrical signal carrying a program downloaded, e.g., from a server on the Internet, is a computer-readable signal medium, but is not included in the examples of the non-transitory computer-readable storage medium.

In the following description, processes such as "judging," "analyzing," "referring," "detecting," "adding," "deleting," "cancelling," "discarding," "extracting," "selecting," "reading," "developing," "writing," "saving," "storing," "outputting," "transmitting," "sending," "calculating," "determining," "specifying," "identifying," "obtaining," "acquiring," "accepting," "receiving," "controlling," and "setting" may represent processes by the CPU 12. The processes by the CPU 12 may include hardware control via an OS ("OS" is an abbreviation for "Operating System"). It is noted that "obtaining" or "acquiring" may be used as a concept that does not necessarily require a request. Namely, a process of the CPU 12 receiving data without making a request for the data may be included in a concept of "the CPU 12 obtains (acquires) the data." Further, "data" in the present disclosure may be expressed in a computer-readable bit sequence.

Additionally, a plurality of pieces of data having substantially the same meaning or content but expressed in different formats shall be treated as the same data. The same may apply to "information" in the present disclosure.

Figure 2A:
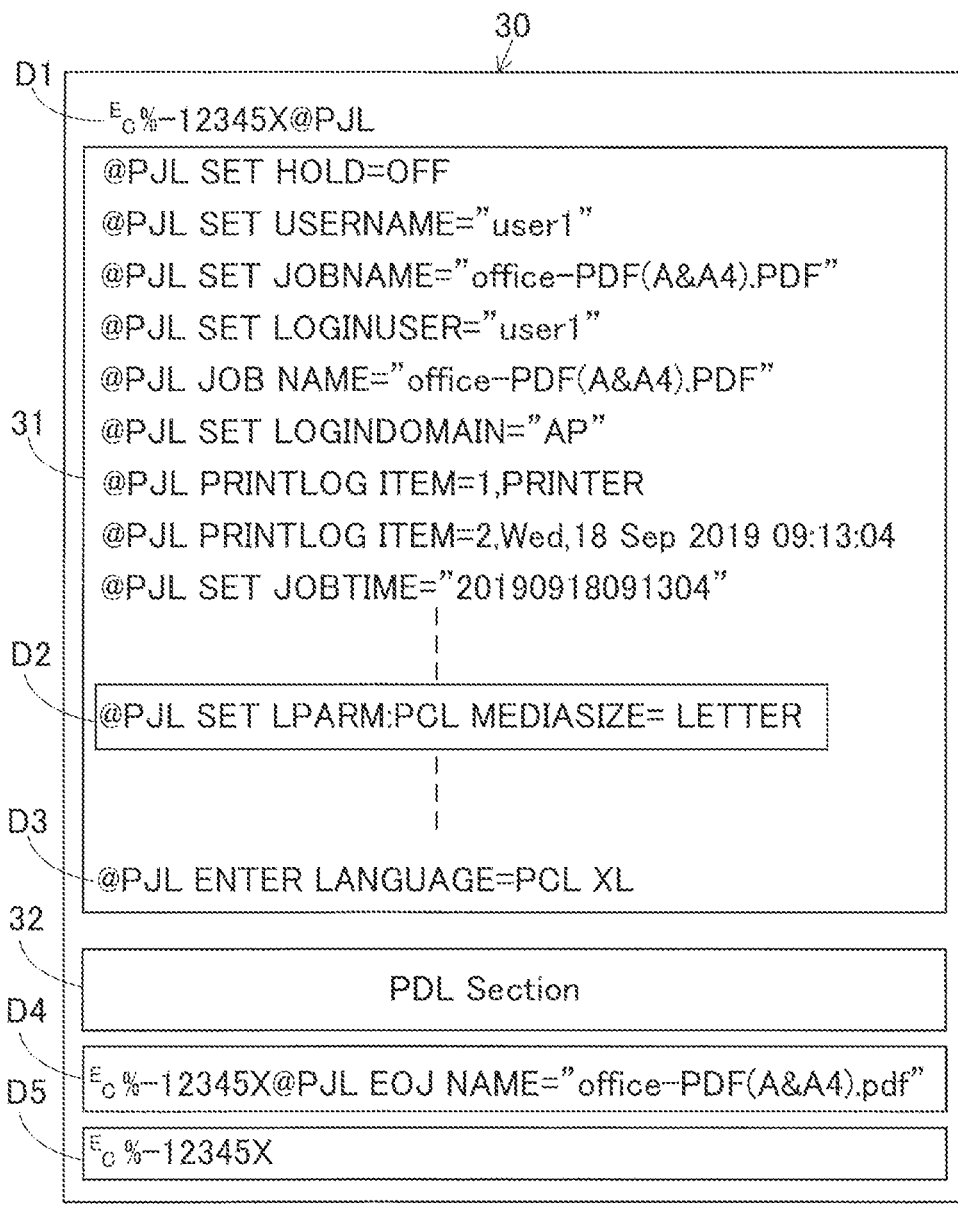
FIG. 2A shows an example of a print job obtained by the image forming apparatus, in the illustrative embodiment according to one or more aspects of the present disclosure.

Next, referring to FIG. 2A, an explanation will be provided of a configuration of a print job obtained by the image forming apparatus 10 from the information processing device 40. The print job 30 has a PJL section 31 described in the PJL, and a PDL section 32. Data D1 "EC %-12345X@PJL" described at the beginning of the print job 30 is an opening command representing that the PJL section 31 with PJL data described therein starts from the next line. Each PJL data included in the PJL section 31 represents a corresponding one of various types of information such as a name of a creator of the print job 30, a name of the print job 30, and print setting information. The print setting information includes a sheet size, a printing direction, designation of color printing or monochrome printing, the number of copies to be printed, and print quality. For instance, PJL data D2 "@PJL SET LPARM:PCL MEDIASIZE=LETTER" represents an instruction to set the sheet size to "LETTER."

Data D3 "@PJL ENTER LANGUAGE=PCL XL" described at the end of the PJL section 31 is PJL data representing that the PJL section 31 ends with this data and that the PDL section 32 described in a PDL ("PDL" is an abbreviation for "Page Description Language") starts from the next line. Examples of the PDL may include, but are not limited to, a PCL ("PCL" is an abbreviation for "Printer Command Language"), and a PS ("PS" is an abbreviation for "Post Script") data. Data D4 "EC %-12345X@PJL EOJ NAME="office-PDF(A&A4).pdf" described following the PDL section 32 is PJL data indicating the end of the print job 30. Data 5 "EC %-12345X" described in the next line of the data D4 is a command indicating the end of an analysis process for the PDL section 32.

Figure 2B:
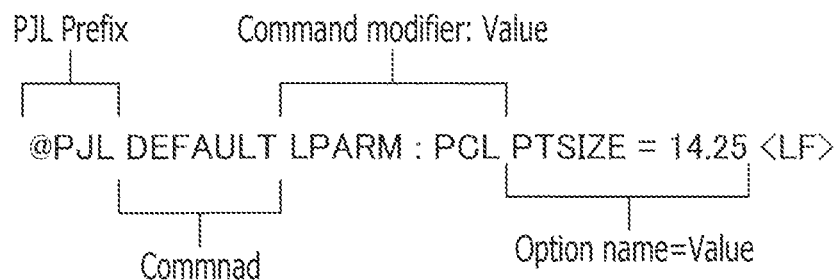
FIG. 2B shows an example of PJL data in the illustrative embodiment according to one or more aspects of the present disclosure.

Subsequently, elements included in the PJL data will be described with reference to FIG. 2B. FIG. 2B shows an example of PJL data, which is PJL data "@PJL DEFAULT LPARM:PCL PTSIZE=14.25." The PJL data shown in FIG. 2B provides an instruction to set an initial point size to 14.25 to print the PDL section 32 described in the PCL. The PJL data includes four elements of "PJL Prefix," "Command," "Command modifier:Value," and "Option name." In FIG. 2B, "@PJL" is the "PJL Prefix." "DEFAULT" is "Command." "LPARM:PCL" is "Command modifier:Value." "PTSIZE=14.25" is "Option name=Value." Hereinafter, "PJL Prefix" may be referred to as a first element. "Command" may be referred to as a second element. "Command modifier:Value" may be referred to as a third element. "Option name=Value" may be referred to as a fourth element.

The first element is indispensable. There are two formats for PJL data, i.e., Format 1 in which PJL data includes only the first and second elements, and Format 2 in which PJL data includes the first to fourth elements. The second to fourth elements are allowed to be omitted according to PJL standards. Hereinafter, among the PJL data in Format 2, PJL data described in a format in which any of the second to fourth elements are not omitted may be referred to as a "non-omitted-type PJL data." In addition, PJL data described in a format in which one or two of the second to fourth elements are omitted may be referred to as an "omitted-type PJL data."

There are two types of definitions of PJL data to be processed by image forming apparatuses. One type of definition is commonly used by a plurality of image forming apparatuses of different models. The other type of definition is not commonly used. For instance, in PJL data indicating the sheet size, the sheet size is defined as "@PJL SET LPARM:PCL MEDIASIZE=LETTER" in Model A, whereas the sheet size is defined as "@PJL SET LPARM: PCL PAPER=LETTER" in Model B. For instance, when an image forming apparatus connected with the information processing device 40 (see FIG. 1) is changed from Model A to Model B, even though the information processing device 40 sends "@PJL SET LPARM:PCL MEDIASIZE=LETTER" as PJL data to the image forming apparatus, the image forming apparatus will not be able to set the sheet size to a letter size by analyzing the received PJL data. Model A and Model B may be models of the same manufacturer or of respective different manufacturers. Therefore, in order to enable Model B to process PJL data sent from the information processing device 40 to Model A, the inventor of an inventive concept according to the present disclosure has developed a technology to convert the PJL data into PJL data usable by Model B. In other words, the technology is characterized in that, when PJL data obtained from the information processing device 40 is non-target PJL data that is not intended for causing the image forming apparatus 10 to perform a particular process such as setting a printing function, the non-target PJL data is converted into target PJL data that is intended for causing the image forming apparatus 10 to perform the particular process. Hereinafter, the non-target PJL data not intended for causing the image forming apparatus 10 to perform the above particular process may be referred to as "pre-conversion PJL data." Further, the target PJL data intended for causing the image forming apparatus 10 to perform the above particular process may be referred to as "post-conversion PJL data."

By installing a driver for controlling Model B into the information processing device 40, the information processing device 40 is enabled to transmit PJL data conforming to specifications of Model B. However, a system administrator who manages the image forming system 1 wants to avoid changing a program for the image forming system 1 as much as possible because it requires a lot of efforts and might be a factor that interferes with normal operations of the image forming system 1. Therefore, the inventor has developed the technology that makes it possible to use PJL data that had been transmitted by the information processing device 40 to the image forming apparatus 10 without changing the program for the image forming system 1, even when the model of the image forming apparatus 10 connected with the information processing device 40 is changed.

Next, conversion modes for PJL data will be described with reference to FIGS. 3 and 4A to 4B. Conversion Mode 1 is a conversion mode for converting PJL data in the aforementioned Format 1 that includes only the first and second elements. Example 1 shown in FIG. 4A is an example of converting pre-conversion PJL data "@PJL UNKNOWNINIT" in Format 1 into post-conversion PJL data "@PJL INITIALIZE" in Format 1. In addition, Example 2 shown in FIG. 4A is an example of converting pre-conversion PJL data "@PJL UNKNOWNJOB" in Format 1 into post-conversion PJL data "@PJL JOB" in Format 1.

Conversion Mode 2 is a conversion mode for converting PJL data in the aforementioned Format 2. As described above, the PJL data in Format 2 includes the non-omitted-type PJL data and the omitted-type PJL data. Therefore, when the non-omitted-type PJL data is described as pre-conversion PJL data for the conversion rules, if obtained PJL data is non-omitted-type PJL data, the CPU 21 may convert the obtained PJL data into post-conversion PJL data according to the conversion rules. In addition, when the omitted-type PJL data is described as pre-conversion PJL data for the conversion rules, when the obtained PJL data is omitted-type PJL data, the CPU 21 may convert the obtained PJL data into post-conversion PJL data according to the conversion rules. Further, the CPU 21 is enabled to analyze both the non-omitted-type PJL data and the omitted-type PJL data. Hence, any of the non-omitted-type PJL data and the omitted-type PJL data may be described as post-conversion PJL data for the conversion rules.

Example 1 shown in FIG. 4B is an example of converting omitted-type PJL data "@PJL INQUIRE MEDIASIZE" in which the third element is omitted, among the obtained PJL data, into omitted-type post-conversion PJL data "@PJL INQUIRE PAPER" in which the third element is omitted. Example 2 shown in FIG. 4B is an example of converting non-omitted-type PJL data "@PJL INQUIRE LPARM: PCL MEDIASIZE," among the obtained PJL data, into non-omitted-type post-conversion PJL data "@PJL INQUIRE LPARM: PCL PAPER." Example 3 shown in FIG. 4B is an example of converting non-omitted-type PJL data "@PJL SET LPARM: PCL MEDIASIZE=LETTER," among the obtained PJL data, into non-omitted-type post-conversion PJL data "@PJL SET LPARM: PCL PAPER=LETTER."

Further, PJL data (hereinafter referred to as "unique-type PJL data") unique to the manufacturer of the image forming apparatus 10 may be described as pre-conversion PJL data for the conversion rules. For instance, in the unique-type PJL data, the first to third elements may be omitted, and only the fourth element may be an indispensable element. For instance, when the unique-type PJL data with only the fourth element is described as pre-conversion PJL data for the conversion rules, if the fourth element of the obtained PJL data matches the unique-type PJL data that is the pre-conversion PJL data for the conversion rules, the obtained PJL data may be converted into the post-conversion PJL data associated with the pre-conversion PJL data in the conversion rules, regardless of contents of the second and third elements of the obtained PJL data. Suppose for instance that, in the conversion rules, pre-conversion PJL data (i.e., unique-type PJL data) with only the fourth element "MEDIASIZE=LETTER" is associated with post-conversion PJL data "PAPER=LETTER." If "MEDIASIZE=LETTER" is in the fourth element of the obtained PJL data, the obtained PJL data is converted into the post-conversion PJL data "PAPER=LETTER" regardless of the contents of the second and third elements of the obtained PJL data. Namely, in all cases where PJL data with "MEDIASIZE=LETTER" in the fourth element thereof is obtained, it is possible to generate post-conversion PJL data in which "MEDIASIZE=LETTER" is converted into "PAPER=LETTER." By using a conversion rule of describing the unique-type PJL data as the pre-conversion PJL data, for instance, it is possible both, to convert an obtained PJL command "@PJL SET MEDIASIZE=LETTER" that instructs temporary sheet size setting into "@PJL SET PAPER=LETTER" and to convert an obtained PJL command "@ PJL DEFAULT MEDIASIZE=LETTER" into "@PJL DEFAULT PAPER=LETTER."

Next, the filter data 13 will be described with reference to FIGS. 6A to 6F. The filter data 13 stored in the flash ROM 12 is for converting the obtained PJL data into the post-conversion PJL data that is analyzable by the image forming apparatus 10. As shown in FIGS. 6A to 6F, in the filter data 13, the pre-conversion PJL data and the post-conversion PJL data are associated with each other. Namely, when the obtained PJL data matches particular pre-conversion PJL data in the filter data 13, the CPU 21 converts the obtained PJL data into the post-conversion PJL data. Numerical values A shown in FIGS. 6A to 6F indicate serial numbers (hereinafter referred to as conversion rule numbers) of the conversion rules when the pre-conversion PJL data is converted into the post-conversion PJL data. FIGS. 6A to 6F show respective examples of the conversion rules 1, 3, 5, 6, 8, and 9 among the conversion rules 1 to 10 for filters shown in FIG. 5A. Each numerical value B shown in FIGS. 6A to 6D indicates the number (i.e., a count of pieces) of the pre-conversion PJL data in a corresponding conversion rule. For instance, when two pieces of pre-conversion PJL data are required for the image forming apparatus 10 to perform a certain process, B=2.

A numerical value F shown in FIG. 6E indicates the number (i.e., a count of pieces) of PJL data to be deleted. For instance, when PJL data, which matches pre-conversion PJL data set as target data to be deleted in the filter data 13, is transmitted by the information processing device 40, the transmitted PJL data is deleted. The CPU 21 does not perform a process specified by the post-conversion PJL data associated with the pre-conversion PJL data that matches the transmitted PJL data. When the number of PJL data to be deleted is one, F=1. A numerical value H shown in FIG. 6F indicates the number (i.e., a count of pieces) of post-conversion PJL data to be added. For instance, when PJL data is obtained from the information processing device 40, and pre-conversion PJL data that matches the obtained PJL data is pre-conversion PJL data set as target data to be added in the filter data 13, the obtained PJL data is converted into post-conversion PJL data associated with the pre-conversion PJL data in the filter data 13, and the converted post-conversion PJL data is added to another piece of post-conversion PJL data. Thereby, the CPU 21 performs a process specified by the added post-conversion PJL data. When the number of post-conversion PJL data to be added is one, H=1.

Each numerical value C shown in FIGS. 6A to 6D indicates a number of a corresponding conversion mode to be applied to the obtained PJL data. For instance, "C=1" represents that the obtained PJL data is to be converted by applying Conversion Mode 1 (see FIG. 4A). A numerical value G shown in FIG. 6E indicates a number of the conversion mode to be applied to the obtained PJL data. In this example, G=3, which represents that the conversion mode to be applied to the obtained PJL data is Conversion Mode 3 (i.e., a deletion mode). In Conversion Mode 3, when the obtained PJL data matches pre-conversion PJL data set for Conversion Mode 3 in the filter data 13, the obtained PJL data is deleted. A numerical value I shown in FIG. 6F indicates a number of the conversion mode to be applied to the obtained PJL data. In this example, I=4, which represents that the conversion mode to be applied to the obtained PJL data is Conversion Mode 4 (i.e., an addition mode). In Conversion Mode 4, when the obtained PJL data matches pre-conversion PJL data set for Conversion Mode 4 in the filter data 13, post-conversion PJL data associated with the pre-conversion PJL data is added to another piece of post-conversion PJL data.

Each numerical value D shown in FIGS. 6B to 6D indicates the number (i.e., a count of pieces) of post-conversion PJL data after conversion. For instance, "D=1" represents that the number of post-conversion PJL data after conversion is 1. Each numerical value E shown in FIGS. 6A to 6D indicates which conversion mode the format for pertinent post-conversion PJL data corresponds to. For instance, "E=1" represents that the pertinent post-conversion PJL data is described in Format 1 corresponding to Conversion Mode 1. In each of the examples shown in FIGS. 6B to 6D, the numerical value C is identical to the numerical value E. However, since the format for describing the post-conversion PJL data may be determined arbitrarily, the numerical value C may be different from the numerical value E.

Next, examples of the conversion rules for converting the obtained PJL data into the post-conversion PJL data will be described with reference to FIGS. 6A to 6F. Conversion Rule 1 (i.e., A=1) shown in FIG. 6A is a conversion rule to which Conversion Mode 1 is applied. Conversion Rule 3 (i.e., A=3) shown in FIG. 6B is a conversion rule to which Conversion Mode 2 is applied. Further, Conversion Rule 3 is associated with Related Rule 4 and Related Rule 7 (see FIG. 6B) that will be described later.

Conversion Rule 4 (i.e., A=4) shown in FIG. 5A is also a conversion rule to which Conversion Mode 2 is applied. Conversion Rule 7 (i.e., A=7) is a conversion rule for converting, into omitted-type post-conversion PJL data, omitted-type PJL data to which Conversion Mode 2 is applied that has only the fourth element included and the second and third elements omitted. Conversion Rule 5 (i.e., A=5) shown in FIG. 6C is a conversion rule to which Conversion Mode 2 is applied. Conversion Rule 5 is an example of a conversion rule for converting L (L≥2) pieces of omitted-type PJL data into K (K<L) pieces of omitted-type post-conversion PJL data. For instance, Conversion Rule 5 is applicable in a case where an image forming apparatus, which needs to obtain L (L≥2) pieces of omitted-type PJL data to perform a single process, has been updated to the image forming apparatus 10 that only needs to obtain K (K<L) pieces of omitted-type PJL data to perform the same single process.

Conversion Rule 6 (i.e., A=6) shown in FIG. 6D is a conversion rule to which Conversion Mode 2 is applied. Conversion Rule 6 is an example of a conversion rule for converting K (K<L) pieces of omitted-type PJL data into L (L≥2) pieces of omitted-type post-conversion PJL data. For instance, Conversion Rule 6 is applicable in a case where, an image forming apparatus, which only needs to obtain K (K<L) pieces omitted-type PJL data to perform a single process, has been updated to the image forming apparatus 10 that needs to obtain L (L≥2) pieces omitted-type PJL data to perform the same single process.

Conversion Rule 8 (i.e., A=8) shown in FIG. 6E is a conversion rule to which Conversion Mode 3 (i.e., the deletion mode) is applied. Conversion Rule 8 is a conversion rule for, when PJL data that matches pre-conversion PJL data for the conversion rule is obtained, deleting the obtained PJL data. The image forming apparatus 10 will no longer convert the pre-conversion PJL data that matches the deleted PJL data into post-conversion PJL data. Conversion Rule 9 (i.e., A=9) shown in FIG. 6F is a conversion rule to which Conversion Mode 4 (i.e., the addition mode) is applied when at least one of PJL data and the PDL section 32 (see FIG. 2) is obtained from the information processing device 40. Conversion Rule 9 adds omitted-type post-conversion PJL data "SET DUPLEX ON" to the obtained PJL data. Thereby, the image forming apparatus 10 performs a process (e.g., duplex printing) specified by the added post-conversion PJL data. The filter data 13 shown in FIG. 5A indicates some of the conversion rules. The filter data 13 may include one or more conversion rules set therein other than the conversion rules shown in FIG. 5A.

The filter data 13 includes related pre-conversion PJL data and related post-conversion PJL data. The related pre-conversion PJL data has data related to the pre-conversion PJL data. The related post-conversion PJL data is associated with the related pre-conversion PJL data. For instance, among the conversion rules set in the filter data 13, when the pre-conversion PJL data to which Conversion Rule 3 is applied is compared with the pre-conversion PJL data to which Conversion Rule 4 is applied, both of the conversion rules are interrelated in that each of the two conversion rules has the third element "LPARM:PCL" and the fourth element "MEDIASIZE=LETTER." In other words, Conversion Rule 3 and Conversion Rule 4 share some of the data included in the pre-conversion PJL data therefor. Namely, Conversion Rule 4 is a related rule of Conversion Rule 3 in the sense that both of the conversion rules have interrelated data. In addition, when the pre-conversion PJL data to which Conversion Rule 3 is applied is compared with the pre-conversion PJL data to which Conversion Rule 7 is applied, both of the conversion rules are interrelated in that each of the conversion rules has the fourth element "MEDIASIZE." Namely, Conversion Rule 7 is a related rule of Conversion Rule 3. As shown in FIG. 6B, in the filter data 13, Conversion Rule 4 and Conversion Rule 7 are associated with Conversion Rule 3 as the related rules of Conversion Rule 3. Reference numerals "4" and "7" in FIG. 6B are indexes for the CPU 21 to search for the related rules of Conversion Rule 3.

As shown in FIG. 5A, except for Conversion Rule 10, the filter data 13 is set divided into a group of Conversion Rules 1 and 2 for which the pre-conversion PJL data includes only "Command" and to which Conversion Mode 1 is applied and a group of Conversion Rules 3 to 7 to which Conversion Mode 2 is applied. In a below-mentioned step S12, the CPU 21 stores the filter data 13 to be set in such a manner as described above. When the conversion rules are arranged in the above manner, to search for the pre-conversion PJL data that matches the obtained PJL data, the CPU 21 only needs to search for the group of the same type as the obtained PJL data, and needs not search for the other group. Therefore, in this case, it is possible to make a search time shorter than when the conversion rules are arranged randomly. Accordingly, it is possible to increase a conversion speed as the search time is reduced. In the group of Conversion Rules 3 to 7 to which Conversion Mode 2 is applied, Conversion Rules 3 and 4, for which non-omitted-type PJL data is set as the pre-conversion PJL data, are arranged first, and then Conversion Rules 5 to 7, for which omitted-type PJL data is set as the pre-conversion PJL data, are arranged following Conversion Rules 3 and 4. In the below-mentioned step S12, the CPU 21 stores the filter data 13 in which Conversion Rules 3 to 7 are arranged in such a manner as described above. In other words, the CPU 21 rearranges the filter data 13 in such a manner that the determination as to whether the obtained PJL data matches at least a part of the non-omitted-type PJL data is made in priority to the determination as to whether the obtained PJL data matches at least a part of the omitted-type PJL data, and stores the rearranged filter data 13 into the flash ROM 12. Therefore, when the obtained PJL data is non-omitted-type PJL data, there is no risk that the non-omitted-type PJL data will be mistakenly converted into omitted-type PJL data.

For instance, filter data 50 shown in FIG. 5B is an example of recommended filter data. In the filter data 50, a conversion rule R1 for converting non-omitted-type PJL data is placed first, and a conversion rule R2 for converting omitted-type PJL data is placed following the conversion rule R1. Filter data 51 shown in FIG. 5C is an example of unrecommended filter data. In the filter data 51, a conversion rule R1 for converting the omitted-type PJL data is placed first, and a conversion rule R2 for converting the non-omitted-type PJL data is placed following the conversion rule R1. Pre-conversion PJL data "SET ORGTRAY=1" and post-conversion PJL data "SET TRAY=STD" are non-omitted-type PJL data. Pre-conversion PJL data "ORGTRAY" and post-conversion PJL data "TRAY" are omitted-type PJL data.

Suppose for instance that the filter data 51 is used, and the PJL data obtained by the CPU 21 is "SET ORGTRAY=1." The obtained PJL data "SET ORGTRAY=1" is non-omitted-type PJL data. Hence, the obtained PJL data "SET ORGTRAY=1" originally has to be converted into the non-omitted-type PJL data "SET TRAY=STD." The CPU 21 refers to the filter data 51 from the beginning thereof. Namely, the CPU 21 refers to the conversion rule R1 and determines whether the obtained PJL data "SET ORGTRAY=1" matches "ORGTRAY". Here, "ORGTRAY" included in the obtained PJL data "SET ORGTRAY=1" matches the pre-conversion PJL data "ORGTRAY" for the conversion rule R1. Therefore, the CPU 21 converts "ORGTRAY" included in the obtained PJL data "SET ORGTRAY=1" into "TRAY." As a result, the obtained PJL data "SET ORGTRAY=1" is converted into "SET TRAY=1." Namely, the obtained PJL data is converted into the omitted-type PJL data "SET TRAY=1" instead of the non-omitted-type PJL data "SET TRAY=STD" into which the obtained PJL data originally has to be converted. In this case, the image forming apparatus 10 is unable to perform the process specified by the obtained PJL data.

In the above example, in order to avoid the conversion error, as set in the filter data 50 shown in FIG. 5B, the pre-conversion PJL data "SET ORGTRAY=1" is associated with the post-conversion PJL data "SET TRAY=STD" for the conversion rule R1, and the pre-conversion PJL data "ORGTRAY" is associated with the post-conversion PJL data "TRAY" for the conversion rule R2. In this case, the CPU 21 refers to the conversion rule R1 and determines that the obtained PJL data "SET ORGTRAY=1" matches the pre-conversion PJL data "SET ORGTRAY=1" for the conversion rule R1. Therefore, the obtained PJL data "SET ORGTRAY=1" is correctly converted into the post-conversion PJL data "SET ORGTRAY=1."

Next, a main routine to be executed by the CPU 21 of the controller 20 will be described with reference to FIGS. 7 and 8. The following provides an explanation of a process to be performed when the CPU 21 receives the print job 30 (see FIG. 2A) sent from the information processing device 40 (see FIG. 1). The CPU 21 executes each process of the main routine and subroutines in accordance with the program 24 stored in the ROM 23. In the following description, each step included in the main routine and subroutines to be executed by the CPU 21 will be represented with "S" added in front of a corresponding number.

Figure 7:
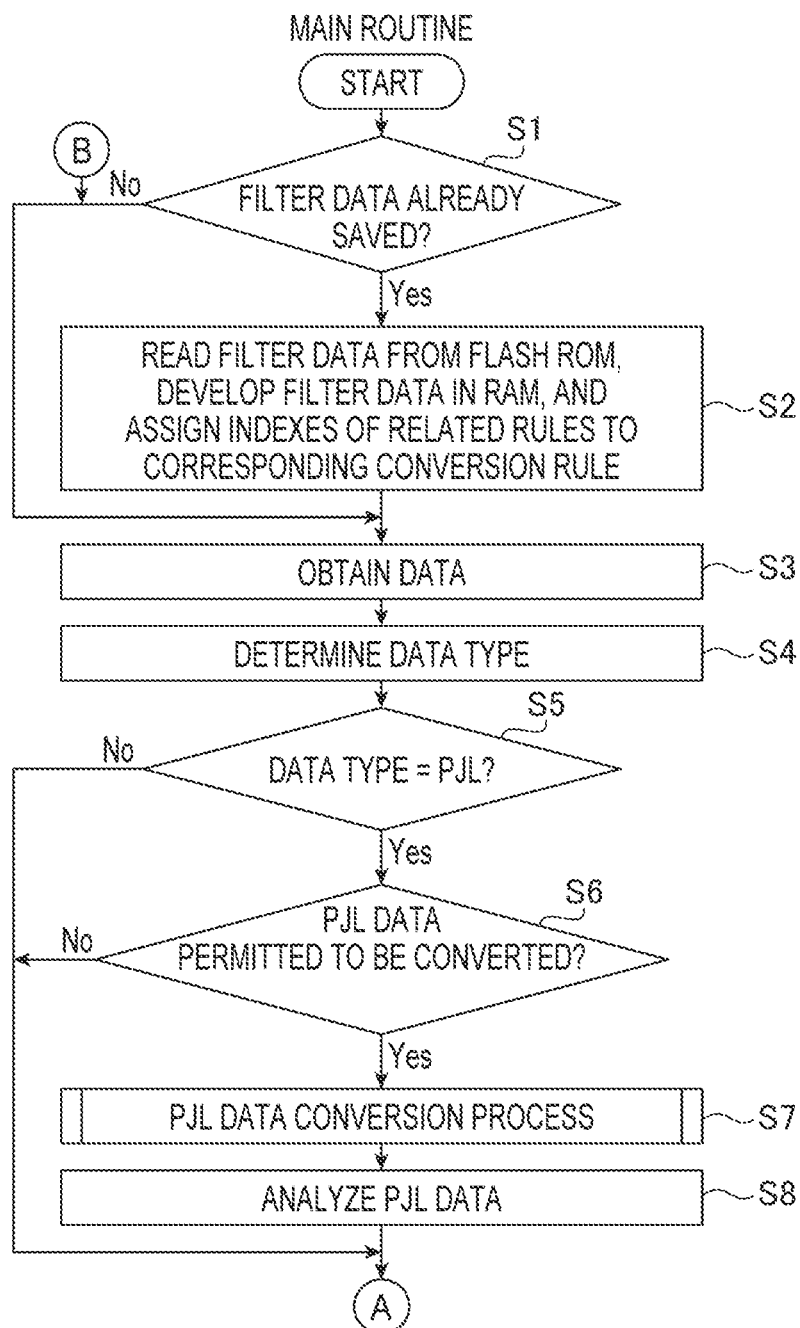
FIGS. 7 and 8 are flowcharts showing a procedure of a main routine to be executed by a CPU of the image forming apparatus, in the illustrative embodiment according to one or more aspects of the present disclosure.

The CPU 21 determines whether the filter data 13 (see FIG. 5A) has already been saved in the flash ROM 12 (see FIG. 1) (S1 in FIG. 7). When determining that the filter data 13 has already been saved in the flash ROM 12 (S1: Yes), the CPU 21 reads out the filter data 13 from the flash ROM 12 and develops the read filter data 13 in the RAM 22 (see FIG. 1) (S2). It is noted that the filter data 13 may be read out of the flash ROM 12 and then developed in the RAM 22 when the image forming apparatus 10 is booted. If the filter data 13 is previously stored in the RAM 22, the filter data 13 may be read out of the RAM 22 and then developed in the RAM 22. Additionally, to a conversion rule associated with one or more related rules in the filter data 13 read out of the flash ROM 12, the CPU 21 assigns indexes of the one or more related rules (S2). In the example shown in FIG. 5A, Conversion Rule 3 is associated with Related Rule 4 and Related Rule 7. Hence, indexes "4" and "7" are assigned to Conversion Rule 3. Each index may be a symbol other than numerals, or a combination of a numeral and a symbol as long as it is usable to identify a corresponding related rule.

Subsequently, the CPU 21 obtains data from the information processing device 40 (S3) and determines a type of the obtained data (S4). Then, based on the determined type, the CPU 21 determines whether the obtained data is PJL data (S5). When determining that the obtained data is PJL data (S5: Yes), the CPU 21 determines whether the obtained PJL data is PJL data permitted to be converted into post-conversion PJL data (S6). A list of PJL data prohibited from being converted into post-conversion PJL data is stored in the flash ROM 12. When the obtained PJL data is not in the list, the CPU 21 determines that the obtained PJL data is PJL data permitted to be converted into post-conversion PJL data (S6: Yes).

For instance, the list of PJL data prohibited from being converted may include PJL data that provides an instruction to upload a file stored in the image forming apparatus 10 onto a network, and PJL data that provides an instruction to delete a file. Thereby, when the image forming apparatus 10 is connected with a network such as the Internet, it is possible to prevent file uploading or file deletion due to attacks from malicious persons. Thus, it is possible to enhance the security of the image forming apparatus 10.

When determining that the obtained PJL data is PJL data permitted to be converted (S6: Yes), the CPU 21 performs a below-mentioned PJL data conversion process (S7). Then, the CPU 21 analyzes the PJL data (S8) and determines whether the data D3 "@PJL ENTER LANGUAGE=PCL XL" (see FIG. 2A) has been detected (S9 in FIG. 8). When determining that the data D3 "@PJL ENTER LANGUAGE=PCL XL" has been detected (S9: Yes), the CPU 21 determines whether data described next to the data D3 "@PJL ENTER LANGUAGE=PCL XL" is the PDL section 32 (see FIG. 2A) (S10). When determining that the data described next to the data D3 "@PJL ENTER LANGUAGE=PCL XL" is the PDL section 32 (S10: Yes), the CPU 21 determines whether additional post-conversion PJL data exists in the filter data 13 (S15). The additional post-conversion PJL data is post-conversion PJL data to be added to the obtained data, and hereinafter may be referred to as "additional target PJL data." When determining that the additional target PJL data exists in the filter data 13 (S15: Yes), the CPU 21 obtains the additional target PJL data from the filter data 13 and adds the obtained additional target PJL data to the data that has already been obtained by the CPU 21 (S16). For instance, post-conversion PJL data "SET DUPLEX ON" shown in FIG. 6F is additional post-conversion PJL data. Thereby, the image forming apparatus 10 performs a process (e.g., duplex printing) specified by the added post-conversion PJL data.

Next, the CPU 21 performs a RIP process (S17) and a printing process (S18). The printing process (S18) is performed after the PJL data conversion process (S7). Therefore, the instruction indicated by the PJL data obtained through the conversion by the PJL data conversion process is reflected in the printing process. Specifically, when the post-conversion PJL data converted through the PJL data conversion process provides an instruction to change settings for the printing function, the CPU 21 changes the settings for the printing function according to the instruction, and performs printing based on the changed settings for the printing function and the obtained PDL section 32. When determining that the data described next to the data D3 "@PJL ENTER LANGUAGE=PCL XL" is not the PDL section 32 (S10: No), the CPU 21 determines whether the data described next to the data D3 "@PJL ENTER LANGUAGE=PCL XL" is the filter data 13 (S11). When determining that the data described next to the data D3 "@PJL ENTER LANGUAGE=PCL XL" is the filter data 13 (S11: Yes), the CPU 21 performs a below-mentioned filter data R/W process (S12). When determining that the data described next to the data D3 "@PJL ENTER LANGUAGE=PCL XL" is not the filter data 13 (S11: No), the CPU 21 determines whether the data described next to the data D3 "@PJL ENTER LANGUAGE=PCL XL" is PCL filter data (S13). When determining that the data described next to the data D3 "@PJL ENTER LANGUAGE=PCL XL" is the PCL filter data (S13: Yes), the CPU 21 performs a PCL filter data R/W process (S14). In the PCL filter data R/W process, the CPU 21 performs a process of writing the obtained PCL filter data into the flash ROM 12 and a process of reading out the PCL filter data from the flash ROM 12.

The PCL filter data is filter data for converting PCL data un-processable by the image forming apparatus 10 into PCL data processable by the image forming apparatus 10. When determining that the obtained data is not PJL data (S5: No, in FIG. 7) or that the obtained PJL data is not PJL data permitted to be converted (S6: No), the CPU 21 goes to S9 (see FIG. 8). Further, when determining that the data D3 "@PJL ENTER LANGUAGE=PCL XL" has not been detected (S9: No), the CPU 21 goes back to S3 (see FIG. 7) to obtain data. When determining that the data described next to the data D3 "@PJL ENTER LANGUAGE=PCL XL" is not the PCL filter data (S13: No), the CPU 21 terminates the main routine.

Figure 9:
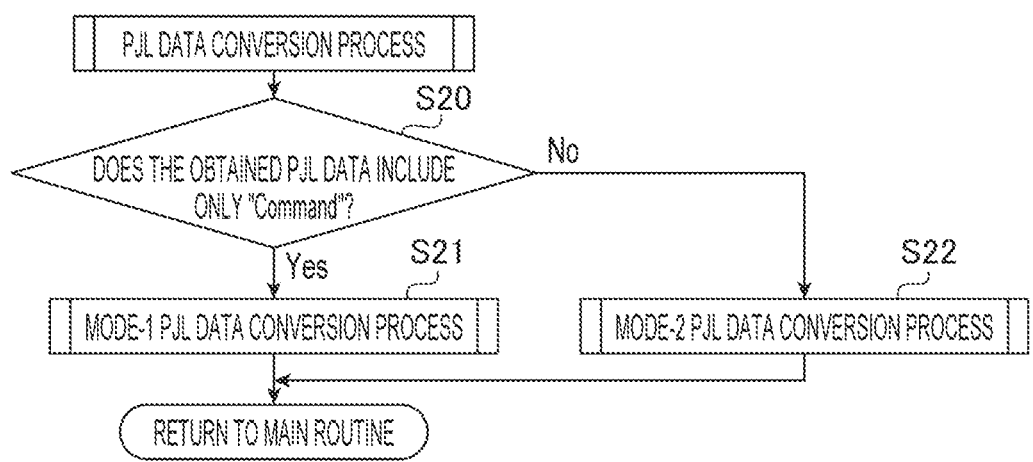
FIG. 9 is a flowchart showing a procedure of a PJL data conversion process in the illustrative embodiment according to one or more aspects of the present disclosure.

Subsequently, the PJL data conversion process to be performed by the CPU 21 in S7 (see FIG. 7) of the main routine will be described with reference to FIG. 9. The CPU 21 determines whether the PJL data obtained in S3 (see FIG. 7) of the main routine is PJL data including only the second element "Command" (S20). When determining that the PJL data obtained in S3 is PJL data including only "Command" (S20: Yes), the CPU 21 performs a below-mentioned Mode-1 PJL data conversion process (S21). Meanwhile, when determining that the PJL data obtained in S3 is not PJL data including only "Command" (S20: No), the CPU 21 performs a below-mentioned Mode-2 PJL data conversion process (S22). Namely, as described above, the filter data 13 is set divided into the group of Conversion Rules 1 and 2 for which the pre-conversion PJL data includes only "Command" and to which Conversion Mode 1 is applied and the group of Conversion Rules 3 to 7 to which Conversion Mode 2 is applied. Therefore, the CPU 21 determines whether the PJL obtained in S3 is PJL data including only "Command," thereby specifying a search target group from the two groups and determine a processing routine to be applied to the search target group. Thus, it is possible to eliminate useless searches and thus shorten the search time. Accordingly, it is possible to increase the conversion speed as the search time is reduced. It is noted that hereinafter, the PJL data obtained in S3 may be simply referred to as "the obtained PJL data," which may be distinguished from "the PJL data that has already been obtained."

Figure 10:
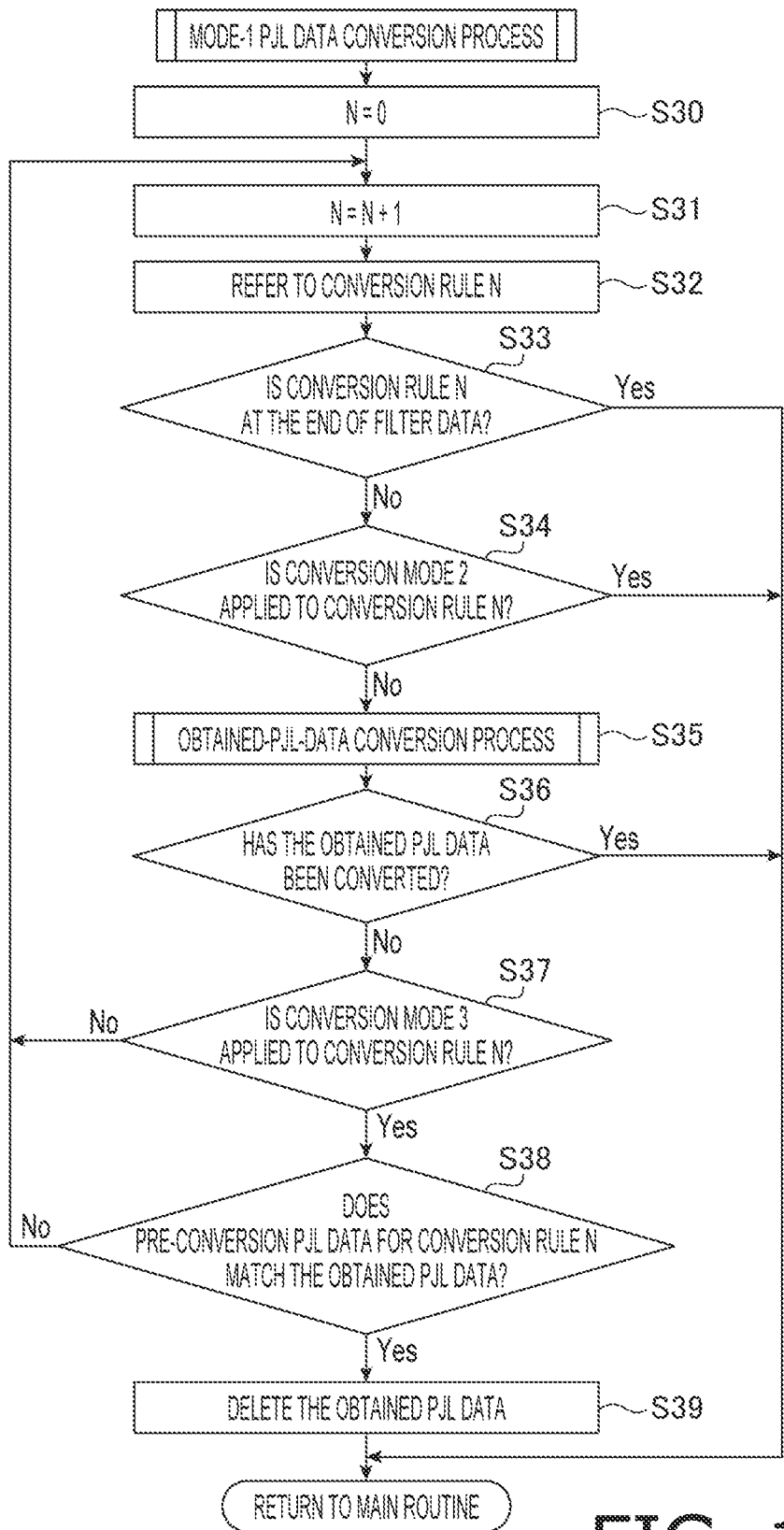
FIG. 10 is a flowchart showing a procedure of a Mode-1 PJL data conversion process in the illustrative embodiment according to one or more aspects of the present disclosure.

Next, the Mode-1 PJL data conversion process to be performed by the CPU 21 in S21 (see FIG. 9) of the PJL data conversion process will be described with reference to FIG. 10. The CPU 21 sets, to "0," a conversion rule number N of a conversion rule to be referred to (S30). The conversion rule number N is a number indicated by the symbol "A" in FIG. 5A. Then, the CPU 21 increments the conversion rule number N by "1" (S31) and refers to the conversion rule with the conversion rule number N=1 (S32).

Subsequently, the CPU 21 determines whether the conversion rule number N being currently referred to is a conversion rule number indicating a conversion rule at the end of the filter data 13 (S33). When determining that the conversion rule number N being currently referred to is not the conversion rule number indicating the conversion rule at the end of the filter data 13 (S33: No), the CPU 21 determines whether the conversion rule being currently referred to is a conversion rule to which Conversion Mode 2 is applied (S34). When determining that the conversion rule being currently referred to is a conversion rule to which Conversion Mode 2 is applied (S34: Yes), the CPU 21 goes back to the main routine. Meanwhile, when determining that the conversion rule being currently referred to is not a conversion rule to which Conversion Mode 2 is applied (S34: No), the CPU 21 performs a below-mentioned obtained-PJL-data conversion process (S35). In the example shown in FIG. 5A, the conversion rule number indicating the conversion rule at the end of the filter data 13 is "10." However, the conversion rule number indicating the conversion rule at the end of the filter data 13 depends on the number of the conversion rules included in the filter data 13. Then, the CPU 21 determines whether the PJL data obtained in S3 (see FIG. 7) of the main routine has been converted (S36). When determining that the PJL data obtained in S3 has been converted (S36: Yes), the CPU 21 terminates the Mode-1 PJL data conversion process.

When determining that the conversion rule number N being currently referred to is the conversion rule number indicating the conversion rule at the end of the filter data 13 (S33: Yes), the CPU 21 goes back to the main routine. When determining that the PJL data obtained in S3 has not been converted (S36: No), the CPU 21 determines whether Conversion Rule N being currently referred to by executing S32 is a conversion rule to which Conversion Mode 3 (i.e., the deletion mode) is applied (S37). When determining that Conversion Rule N being currently referred to is a conversion rule to which Conversion Mode 3 is applied (S37: Yes), the CPU 21 determines whether the pre-conversion PJL data for Conversion Rule N being currently referred to matches the obtained PJL data (S38). When determining that the pre-conversion PJL data for Conversion Rule N being currently referred to matches the obtained PJL data (S38: Yes), the CPU 21 deletes the obtained PJL data (S39). For instance, as shown in FIG. 6E, when the obtained PJL data is "MEDIACOLOR" set as pre-conversion PJL data to be deleted in Conversion Rule 8, the CPU 21 deletes the obtained PJL data.

Figure 11:
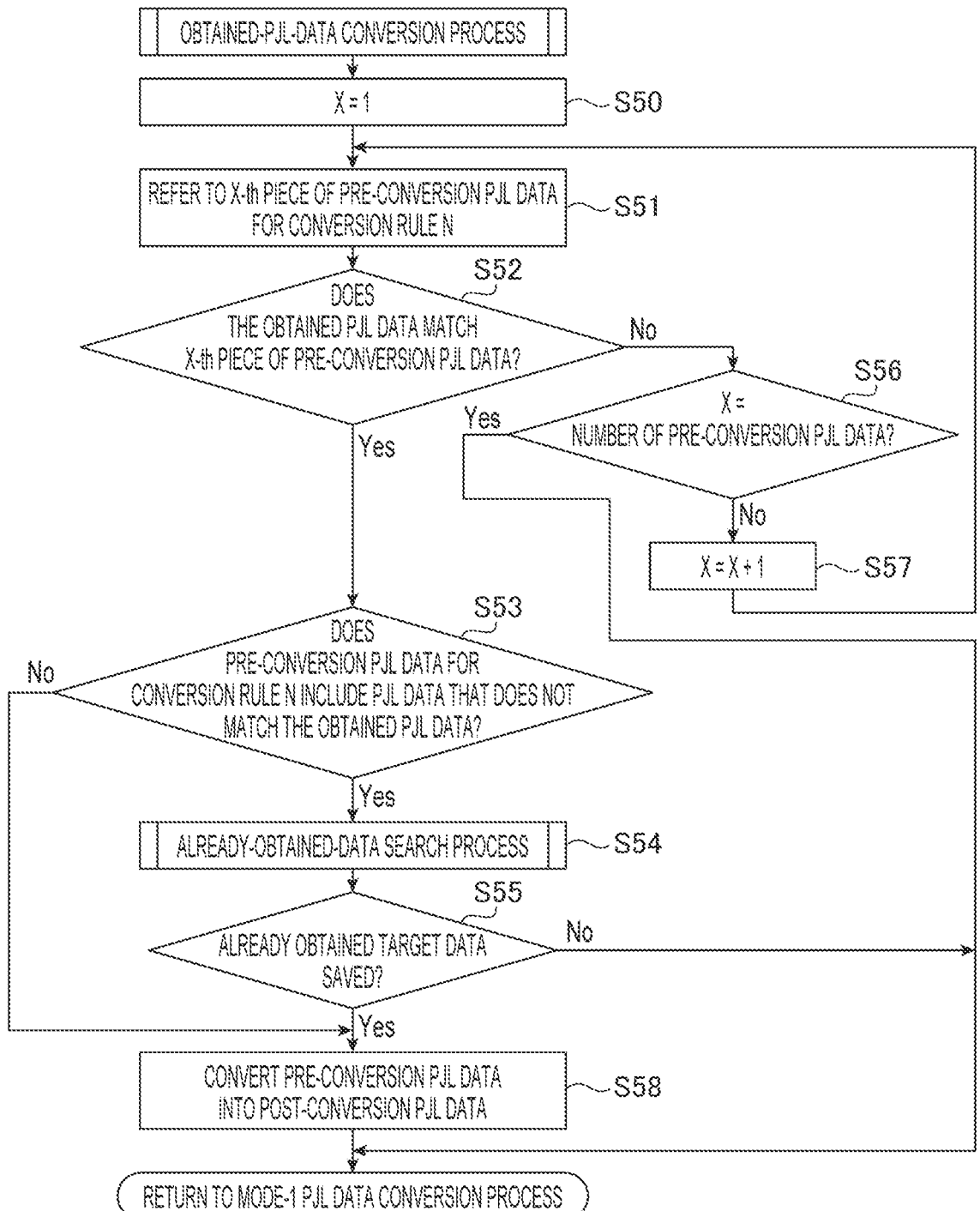
FIG. 11 is a flowchart showing a procedure of an obtained-PJL-data conversion process in the illustrative embodiment according to one or more aspects of the present disclosure.

Next, the obtained-PJL-data conversion process to be performed by the CPU 21 in S35 (see FIG. 10) of the Mode-1 PJL data conversion process will be described with reference to FIG. 11. The CPU 21 sets a reference PJL data number X to "1" (S50). The reference PJL data number X is an ordinal number indicating a position of reference target data to be referred to by the CPU 21 in a sequence of PJL data included in the pre-conversion PJL data for the conversion rule being currently referred to. Setting the reference PJL data number X to "1" means that the first piece of PJL data, among the PJL data included in the pre-conversion PJL data, is set to the reference target data.

Subsequently, the CPU 21 refers to the first (i.e., X=1) piece of PJL data among the pre-conversion PJL data for the conversion rule being currently referred to (S51). Then, the CPU 21 determines whether the PJL data obtained in S3 (see FIG. 7) of the main routine matches the first (i.e., X=1) piece of PJL data among the pre-conversion PJL data for the conversion rule being currently referred to (S52). Here, "match" denotes that all of characters and symbols included in a single piece of PJL data are identical to those included in another single piece of PJL data. Suppose for instance that the obtained PJL data is "UNKNOWNINIT" and that the CPU 21 is currently referring to Conversion Rule 1 (i.e., A=1). As shown in FIG. 5A, the pre-conversion PJL data for Conversion Rule 1 includes only one piece of PJL data "UNKNOWNINIT" and matches the obtained PJL data "UNKNOWNINIT." Accordingly, the CPU 21 determines that the obtained PJL data matches the pre-conversion PJL data for the conversion rule being currently referred to (S52: Yes).

Subsequently, when determining that the obtained PJL data matches the first piece of PJL data among the pre-conversion PJL data for the conversion rule being currently referred to (S52: Yes), the CPU 21 determines whether the pre-conversion PJL data for the conversion rule being currently referred to includes PJL data that does not match the obtained PJL data (S53). When determining that the pre-conversion PJL data for the conversion rule being currently referred to does not include PJL data that does not match the obtained PJL data (S53: No), the CPU 21 converts the obtained PJL data into post-conversion PJL data associated with the pre-conversion PJL data in the conversion rule being currently referred to (S58). Then, the CPU 21 terminates a determination process of determining whether the obtained PJL data matches the pre-conversion PJL data for the conversion rule being currently referred to. Namely, the CPU 21 converts the obtained PJL data (i.e., the pre-conversion PJL data determined in S52 to match the obtained PJL data) into the post-conversion PJL data associated with the said pre-conversion PJL data in the conversion rule being currently referred to, and thereafter terminates the determination process.

Suppose for instance that the obtained PJL data is "UNKNOWNINIT" and that the CPU 21 is referring to Conversion Rule 1. The CPU 21 determines that the pre-conversion PJL data for Conversion Rule 1 being currently referred to does not include PJL data that does not match the obtained PJL data "UNKNOWNINIT" (S53: No), the CPU 21 converts the obtained PJL data "UNKNOWNINIT" (i.e., the pre-conversion PJL data "UNKNOWNINIT") into the post-conversion PJL data "INITIALIZE" associated with the said pre-conversion PJL data "UNKNOWNINIT" in Conversion Rule 1 (S58). Thus, when the obtained PJL data is PJL data to which Conversion Mode 1 is applied, the CPU 21 refers to, in the filter data 13, the group of the conversion rule, for which the pre-conversion PJL data to which Conversion Mode 1 is applied is set, and searches for and finds the pre-conversion PJL data that matches the obtained PJL data, from the group referred to. Therefore, it is possible to shorten the search time. Accordingly, it is possible to increase the conversion speed for converting the pre-conversion PJL data into the post-conversion PJL data as the search time is reduced.

When determining that the pre-conversion PJL data for the conversion rule being currently referred to includes PJL data that does not match the obtained PJL data (S53: Yes), the CPU 21 performs a below-mentioned already-obtained-data search process (see FIG. 12), thereby searching for the PJL data that does not match the obtained PJL data, among other PJL data that has already been obtained. Suppose for instance that the PJL data obtained by the CPU 21 is "UNKNOWNINIT" and that the CPU 21 is referring to Conversion Rule 10. The pre-conversion PJL data for Conversion Rule 10 includes two pieces of PJL data, i.e., "UNKNOWNINIT" and "REBOOT." "REBOOT" is PJL data that does not match the obtained PJL data "UNKNOWNINIT." In this case, the CPU 21 determines that the pre-conversion PJL data for the conversion rule being currently referred to includes PJL data that does not match the obtained PJL data (S53: Yes).

When determining that the obtained PJL data does not match the first (i.e., X=1) piece of PJL data among the pre-conversion PJL data for the conversion rule being currently referred to (S52: No), the CPU 21 determines whether "X," which indicates that the X-th piece of PJL data is currently referred to among the pre-conversion PJL data for the conversion rule being currently referred to, is equal to the number (i.e., a count of pieces) of the pre-conversion PJL data (S56). The number of the pre-conversion PJL data is a total number of PJL data included in the pre-conversion PJL data for the conversion rule being currently referred to. When determining that "X" is not equal to the number (i.e., the count of pieces) of the pre-conversion PJL data (S56: No), the CPU 21 increments "X" by "1" (S57) and refers to the X-th piece of PJL data among the pre-conversion PJL data for the conversion rule being currently referred to (S51).

Suppose for instance that the obtained PJL data is "REBOOT" and the CPU 21 is referring to Conversion Rule 10 (i.e., A=10). The pre-conversion PJL data for Conversion Rule 10 has "UNKNOWNINIT" as the first piece of PJL data and "REBOOT" as the second piece of PJL data. Therefore, the CPU 21 determines that the obtained PJL data "REBOOT" does not match the first piece of PJL data "UNKNOWNINIT" among the pre-conversion PJL data for Conversion Rule 10 (S52: No). Then, the CPU 21 determines that "X" (i.e., "1") is not equal to "2" that is the number (i.e., the count of pieces) of the pre-conversion PJL data (S56: No), and increments "X" by "1," thereby making "X" equal to "2" (i.e., X=2) (S57). Subsequently, the CPU 21 refers to the second (i.e., X=2) piece of PJL data "REBOOT" among the pre-conversion PJL data for Conversion Rule 10 (S51).

Subsequently, the CPU 21 determines that the obtained PJL data "REBOOT" matches the second piece of PJL data "REBOOT" among the pre-conversion PJL data for the conversion rule being currently referred to (S52: Yes). Then, the CPU 21 determines that the pre-conversion PJL data "UNKNOWNINIT" and "REBOOT" for Conversion Rule 10 being currently referred to include the PJL data "UNKNOWNINIT" that does not match the obtained PJL data "REBOOT" (S53: Yes). With respect to the PJL data "UNKNOWNINIT" that does not match the obtained PJL data "REBOOT," the CPU 21 searches for it and determines whether it is included in the PJL data that has already been obtained by the CPU 21, in the below-mentioned already-obtained-data search process.

When determining that "X" is equal to the number (i.e., the count of pieces) of the pre-conversion PJL data (S56: Yes), the CPU 21 terminates the obtained-PJL-data conversion process. Namely, the aforementioned situation (i.e., the situation where the obtained PJL data does not match the X-th piece of PJL data among the pre-conversion PJL data for the conversion rule being currently referred to and where "X" is equal to the number of the pre-conversion PJL data) represents that there is no PJL data found that matches the obtained PJL data even though the obtained PJL data is compared with all of the X pieces of pre-conversion PJL data for the conversion rule being currently referred to. Hence, the CPU 21 terminates the obtained-PJL-data conversion process.

Figure 12:
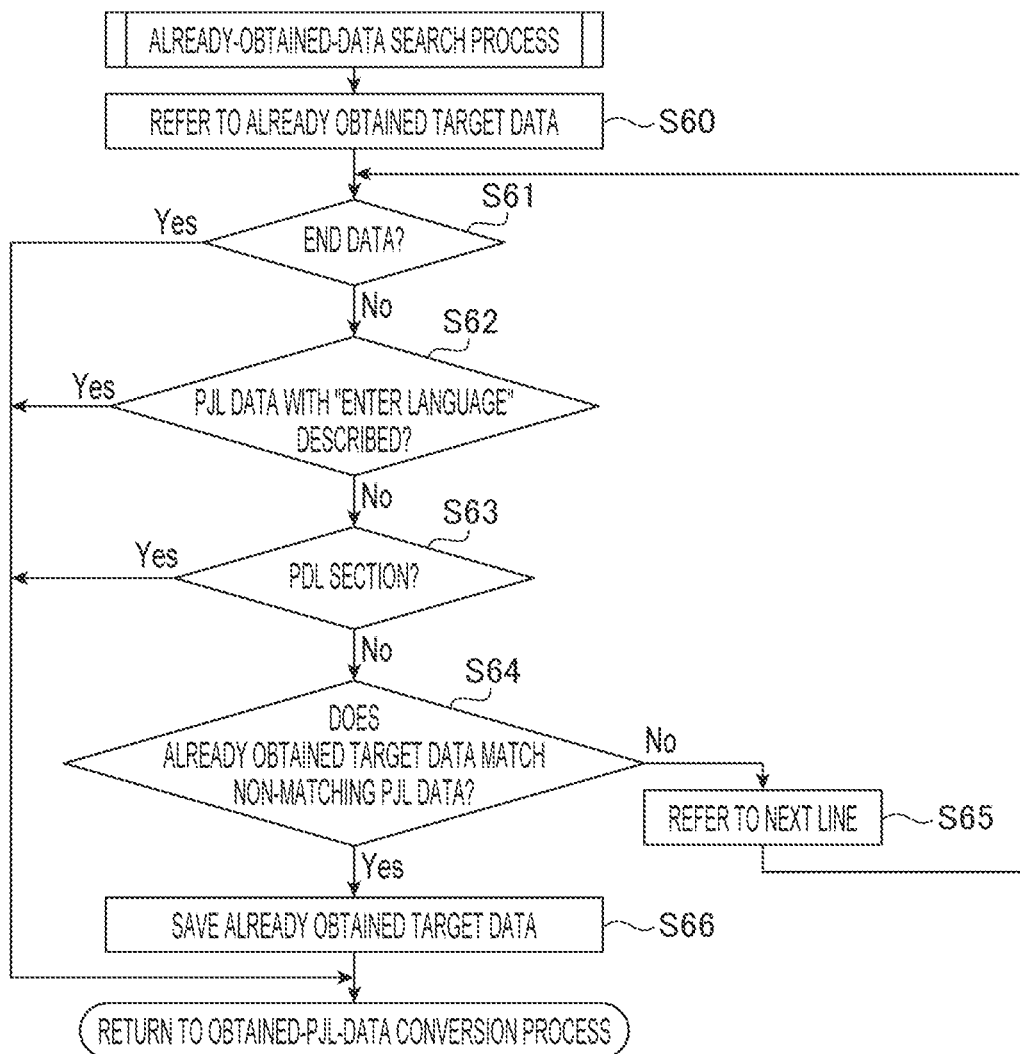
FIG. 12 is a flowchart showing a procedure of an already-obtained-data search process in the illustrative embodiment according to one or more aspects of the present disclosure.

Next, the already-obtained-data search process performed by the CPU 21 in S54 (see FIG. 11) of the obtained-PJL-data conversion process will be described with reference to FIG. 12. In the already-obtained-data search process, the CPU 21 performs a process of searching for the PJL data, which is the data determined in S53 (see FIG. 11) to not match the obtained PJL data among the pre-conversion PJL data for the conversion rule referred to, from among the PJL data that has already been obtained. Hereinafter, the PJL data determined in S53 to not match the obtained PJL data among the pre-conversion PJL data for the conversion rule referred to may be referred to as "non-matching PJL data."

The CPU 21 refers to already obtained target data (S60). The already obtained target data is target data for which the CPU 21 is to determine whether the target data matches the non-matching PJL data. For instance, among a plurality of lines of PJL data that have already been obtained, the CPU 21 refers to PJL data in a first line as the already obtained target data (S60). Then, the CPU 21 determines whether the already obtained target data being currently referred to is end data in a last line of the PJL data that has already been obtained (S61). When determining that the already obtained target data is not the end data (S61: No), the CPU 21 determines whether the already obtained target data is PJL data (e.g., data D3 "@PJL ENTER LANGUAGE=PCL XL" (see FIG. 2A)) with "ENTER LANGUAGE" described (S62). When determining that the already obtained target data is not PJL data with "ENTER LANGUAGE" described (S62: No), the CPU 21 determines whether the already obtained target data is the PDL section 32 (see FIG. 2A) (S63). When determining that the already obtained target data is not the PDL section 32 (S63: No), the CPU 32 determines whether the already obtained target data matches the non-matching PJL data (S64).

When determining that the already obtained target data does not match the non-matching PJL data (S64: No), the CPU 21 refers to PJL data in a next line as the already obtained target data (S65) and executes the steps S61 to S64. Meanwhile, when determining that the already obtained target data matches the non-matching PJL data (S64: Yes), the CPU 21 stores the already obtained target data currently referred to into the RAM 22 (see FIG. 1) (S66). For instance, when the non-matching data is "UNKNOWNINIT," and the already obtained target data when the CPU 21 is referring to data in a second line is PJL data with "UNKNOWNINIT" described, the CPU 21 stores the already obtained target data "UNKNOWNINIT" into the RAM 22. When determining that the already obtained target data is the end data (S61: Yes), or that the already obtained target data is PJL data with "ENTER LANGUAGE" described (S62: Yes), or that the already obtained target data is the PDL section 32 (S63: Yes), the CPU 21 terminates the already-obtained-data search process and returns to the obtained-PJL-data conversion process (see FIG. 11).

In S55 (see FIG. 11) of the aforementioned obtained-PJL-data conversion process, the CPU 21 determines whether the already obtained target data is saved (S55). When determining that the already obtained target data is saved (S55: Yes), the CPU 21 goes to S58. In S58, the CPU 21 refers to the conversion rule having pre-conversion PJL data which includes the X-th piece of pre-conversion PJL data determined in S52 to match the obtained PJL data among the pre-conversion PJL data for the conversion rule referred to and also includes the already obtained target data stored in S66 of the already-obtained-data search process. Namely, the conversion rule to which the CPU 21 refers in S58 is the conversion rule for which the CPU 21 made the affirmative determination in S53 (S53: Yes) and to which the CPU 21 referred in S32 (see FIG. 10). Further, in S58, the CPU 21 converts the obtained PJL data into the post-conversion PJL data associated with the pre-conversion PJL data in the conversion rule being referred to (S58).

Suppose for instance that the obtained PJL data is "REBOOT," that the CPU 21 refers to Conversion Rule 10 in S32, that the X-th piece of pre-conversion PJL data, determined in S52 to match the obtained PJL data among the pre-conversion PJL data for the conversion rule referred to, is "REBOOT" for Conversion Rule 10, and that the already obtained target data stored in S66 (see FIG. 12) of the already-obtained-data search process is "UNKNOWNINIT." The CPU 21 refers to the conversion rule having the pre-conversion PJL data which includes "REBOOT" and "UNKNOWNINIT," that is, Conversion Rule 10 (see FIG. 5A) referred to in S32. Then, the CPU 21 converts the PJL data "UNKNOWNINIT" and "REBOOT" that have been obtained, into the post-conversion PJL data "INTIALIZE" associated with the pre-conversion PJL data "UNKNOWNINIT" and "REBOOT" in Conversion Rule 10. When determining that the already obtained target data is not saved (S55: No), the CPU 21 terminates the obtained-PJL-data conversion process and returns to the Mode-1 PJL data conversion process.

In a case where the pre-conversion PJL data for a conversion rule includes a plurality of pieces of PJL data (two pieces of PJL data in the above example), as for Conversion Rule 10 described above, it is assumed that PJL data matching one of the plurality of pieces of PJL data may have been obtained but it may be unknown whether PJL data matching the other PJL data has already been obtained. In such a case, by performing the aforementioned already-obtained-data search process, it is possible to search for and find PJL data matching the other PJL data from among the PJL data that has already been obtained. Therefore, even if respective pieces of PJL data that match the plurality of pieces of PJL data included in the pre-conversion PJL data are transmitted by the information processing device 40 with an interval of some lines (i.e., with an interval of a certain period of time) between transmissions of the individual PJL data, it is possible to finally find the respective pieces of PJL data that match the plurality of pieces of PJL data transmitted. Therefore, it is possible to accurately convert the pre-conversion PJL data into the post-conversion PJL data.

Figure 13:
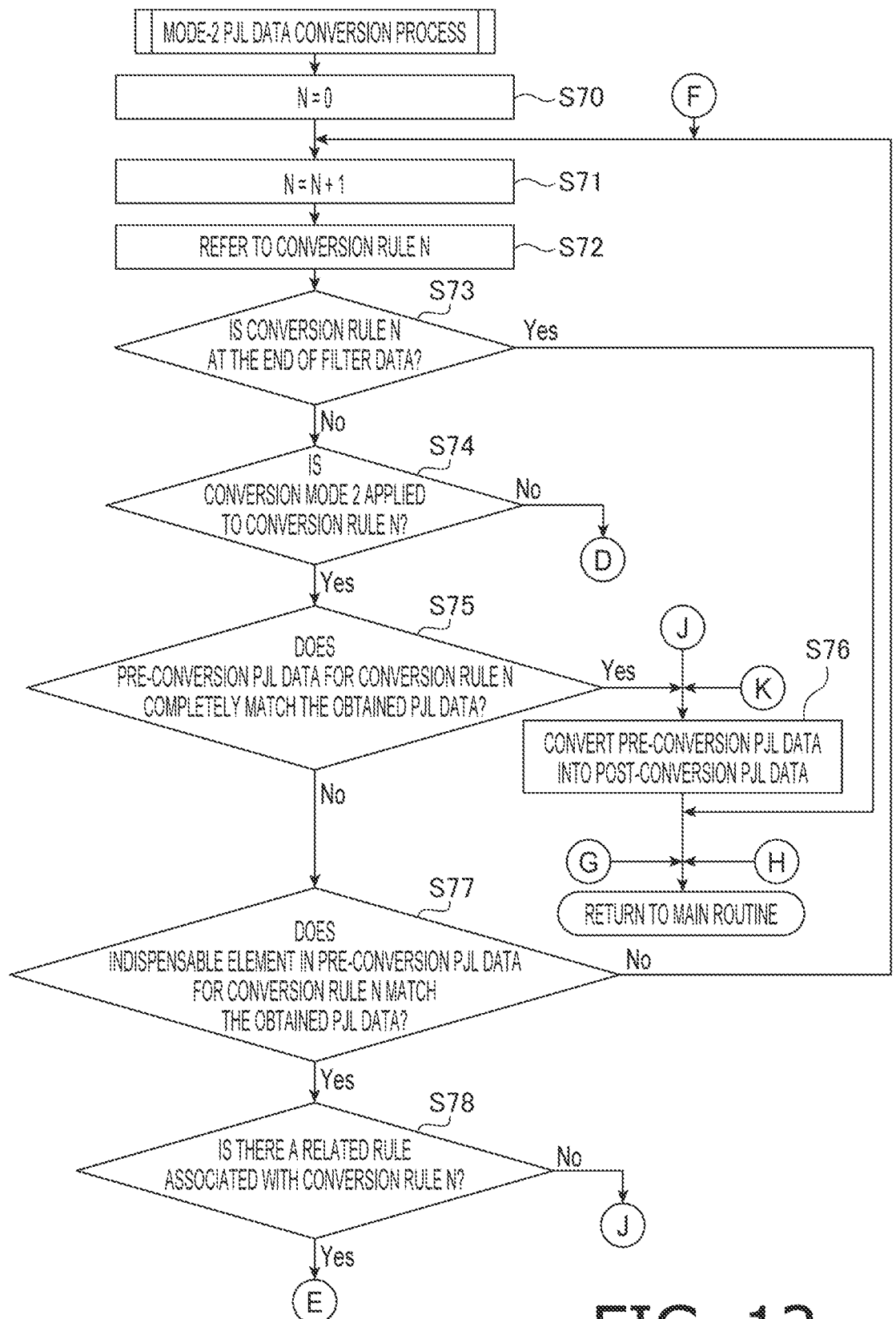
FIGS. 13 and 14 are flowcharts showing a procedure of a Mode-2 PJL data conversion process in the illustrative embodiment according to one or more aspects of the present disclosure.
Figure 14:
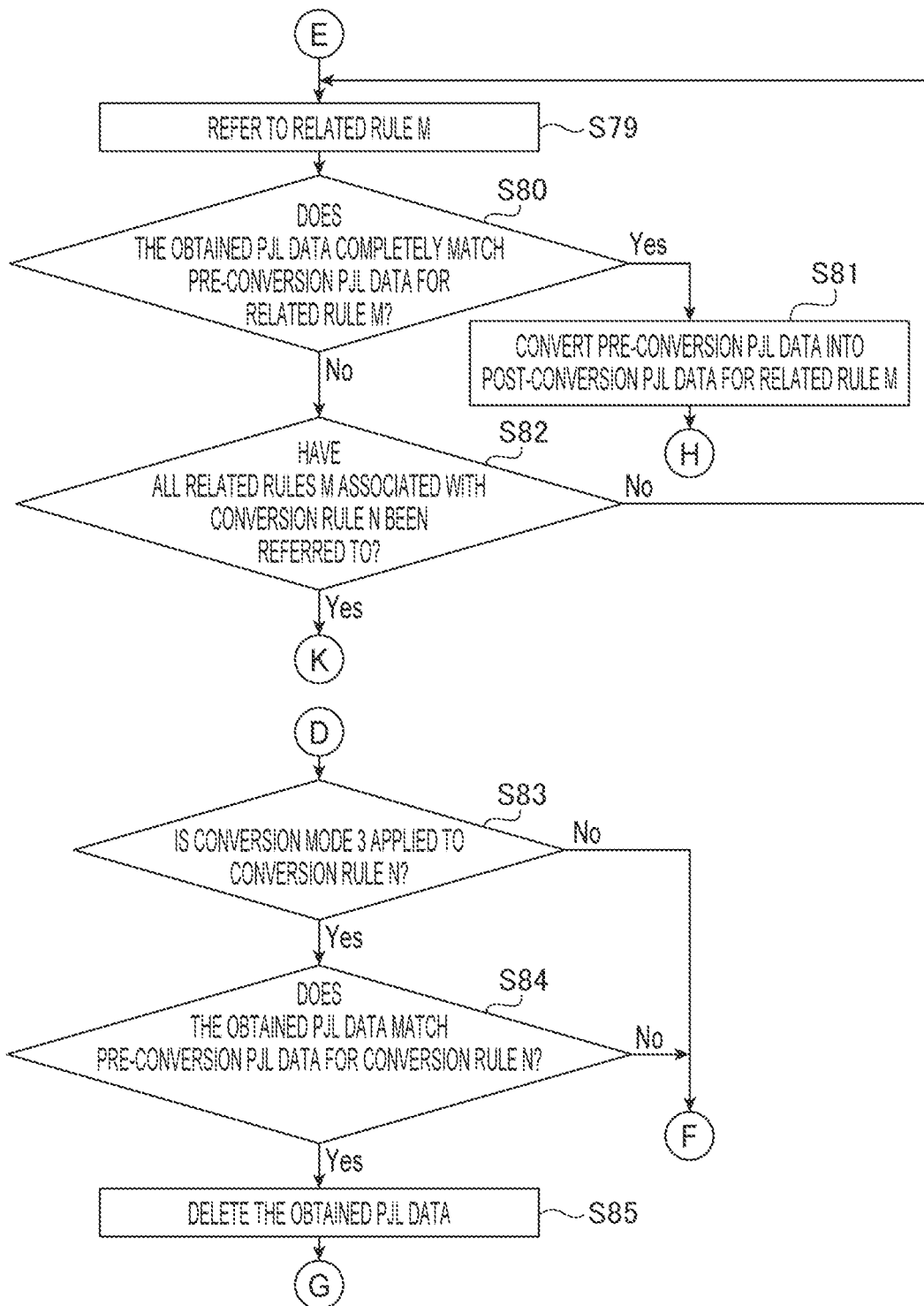

Next, the Mode-2 PJL data conversion process performed by the CPU 21 in S22 (see FIG. 9) of the PJL data conversion process will be described with reference to FIGS. 13 and 14. The CPU 21 sets, to "0," the conversion rule number N of the conversion rule to be referred to (S70). Then, the CPU 21 increments the conversion rule number N by "1" (S71) and refers to Conversion Rule 1 with the conversion rule number N=1 (S72). Subsequently, the CPU 21 determines whether the conversion rule number N is the conversion rule number indicating the conversion rule at the end of the filter data 13 (S73). When determining that the conversion rule number N is not the conversion rule number indicating the conversion rule at the end of the filter data 13 (S73: No), the CPU 21 determines whether the conversion rule of the conversion rule number N being referred to is a conversion rule to which Conversion Mode 2 is applied (S74).

When determining that the conversion rule being referred to is a conversion rule to which Conversion Mode 2 is applied (S74: Yes), the CPU 21 determines whether the pre-conversion PJL data for the conversion rule being referred to completely matches the obtained PJL data (S75). Here, "completely match" denotes that all of characters and symbols included in PJL data are identical to those included in the other PJL data without any difference. When determining that the pre-conversion PJL data for the conversion rule being referred to completely matches the obtained PJL data (S75: Yes), the CPU 21 converts the obtained PJL data into post-conversion PJL data associated with the pre-conversion PJL data in the conversion rule being referred to (S76). For instance, when the obtained PJL data is "SET LPARM:PCL MEDIASIZE LETTER," and the pre-conversion PJL data for Conversion Rule 3 (i.e., N=3) being referred to is "SET LPARM:PCL MEDIASIZE LETTER" (see FIG. 5A), the CPU 21 converts the obtained PJL data "SET LPARM:PCL MEDIASIZE LETTER" into the post-conversion PJL data "SET LPARM:PCL PAPER LETTER" associated with the pre-conversion PJL data in Conversion Rule 3 (S76). Thus, when the obtained PJL data is PJL data to which Conversion Mode 2 is applied, the CPU 21 refers to, in the filter data 13, the group of the conversion rule for which pre-conversion PJL data to which Conversion Mode 2 is applied is set. Then, the CPU 21 searches for and finds pre-conversion PJL data matching the obtained PJL data from the group being referred to. Therefore, it is possible to shorten the search time. Accordingly, it is possible to increase the conversion speed for converting the pre-conversion PJL data into the post-conversion PJL data as the search time is reduced.

When determining that the pre-conversion PJL data for the conversion rule being referred to does not completely match the obtained PJL data (S75: No), the CPU 21 determines whether the indispensable element in the pre-conversion PJL data for the conversion rule being referred to matches the obtained PJL data (S77). The indispensable element is the fourth element that is unable to be omitted among the first to fourth elements included in the PJL data to which Conversion Mode 2 is applied. For instance, when the obtained PJL data is "SET LPARM:PCL MEDIASIZE LETTER," the fourth element "MEDIASIZE" is the indispensable element.

When determining that the indispensable element in the pre-conversion PJL data for the conversion rule being referred to matches the obtained PJL data (S77: Yes), the CPU 21 determines whether there is a related rule associated with the conversion rule being referred to (S78). When determining that there is a related rule associated with the conversion rule being referred to (S78: Yes), the CPU 21 refers to Related Rule M (S79 in FIG. 14). Suppose for instance that the obtained PJL data is "DEFAULT LPARM:PCL MEDIASIZE LETTER" and that the CPU 21 refers to Conversion Rule 3 with the conversion rule number N=3. The pre-conversion PJL data for Conversion Rule 3 is "SET LPARM:PCL MEDIASIZE LETTER" (see FIG. 5A). In addition, the obtained PJL data has the same element "MEDIASIZE" as the fourth element (i.e., the indispensable element) in the pre-conversion PJL data for Conversion Rule 3. Therefore, the CPU 21 determines that the indispensable element in the pre-conversion PJL data for the conversion rule being referred to matches the obtained PJL data (S77: Yes). Then, since Related Rules 4 and 7 are associated with Conversion Rule 3 (see FIG. 5A), the CPU 21 determines that there is a related rule associated with the conversion rule being referred to (S78: Yes), and refers to Related Rule 4 (S79).

Subsequently, the CPU 21 determines whether the obtained PJL data completely matches the pre-conversion PJL data for Related Rule M (S80 in FIG. 14). When determining that the obtained PJL data completely matches the pre-conversion PJL data for Related Rule M (S80: Yes), the CPU 21 converts the obtained PJL data into post-conversion PJL data associated with the pre-conversion PJL data in Related Rule M (S81). Suppose for instance that the obtained PJL data is "DEFAULT LPARM:PCL MEDIASIZE LETTER" and that Related Rule M being referred to is Related Rule 4 (i.e., M=4). The pre-conversion PJL data for Related Rule 4 is "DEFAULT LPARM:PCL MEDIASIZE LETTER" and completely matches the obtained PJL data. Therefore, the CPU 21 converts the obtained PJL data "DEFAULT LPARM:PCL MEDIASIZE LETTER" into the post-conversion PJL data "SET LPARM:PCL PAPER LETTER" (see FIG. 5A) associated with the pre-conversion PJL data in Related Rule 4.

When determining that the obtained PJL data does not completely match the pre-conversion PJL data for Related Rule M (S80: No), the CPU 21 determines whether all of Related Rules M associated with Conversion Rule N referred to in S72 have been referred to (S82). When determining that all of the related rules associated with Conversion Rule N referred to in S72 have been referred to (S82: Yes), the CPU 21 goes back to S76 (see FIG. 13). Namely, if the pre-conversion PJL data for the conversion rule being referred to does not completely match the obtained PJL data (S75: Yes), but the indispensable element in the pre-conversion PJL data for the conversion rule being referred to matches the obtained PJL data (S77: Yes), it represents that one of the obtained PJL data and the pre-conversion PJL data for the conversion rule being referred to is omitted-type PJL data. Further, if the CPU 21 make the affirmative determination in S82 (S82: Yes), it represents that the CPU 21 has referred to all Related Rules M but has found no related rules that have pre-conversion PJL data matching the obtained PJL data. In such a case, the CPU 21 converts the obtained PJL data into post-conversion PJL data that is associated, in the conversion rule being referred to, with the pre-conversion PJL data matching the obtained PJL data (S76). Thus, even when the obtained PJL data is omitted-type PJL data, and there are no related rules M found that have the pre-conversion PJL data matching the obtained PJL data, it is possible to convert the obtained PJL data into the post-conversion PJL data. When determining that not all of Related Rules M associated with Conversion Rule N referred to in S72 have been referred to (i.e., at least one of Related Rules M associated with Conversion Rule N referred to in S72 has not been referred to) (S82: No), the CPU 21 refers to the next Related Rule M (S79).

Suppose for instance that the obtained PJL data includes only the fourth element "MEDIASIZE" with the second and third elements omitted, and that the CPU 21 refers to Conversion Rule 3. The CPU 21 determines that the pre-conversion PJL data for Conversion Rule 3 is "SET LPARM:PCL MEDIASIZE LETTER," and that the indispensable element "MEDIASIZE" matches the obtained PJL data (S77: Yes), and determines that there is a related rule (e.g., Related Rule 4) associated with Conversion Rule 3 (S78: Yes). Then, the CPU 21 refers to Related Rule 4 (S79 in FIG. 14), and determines that the obtained PJL data does not completely match the pre-conversion PJL data "DEFAULT LPARM:PCL MEDIASIZE LETTER" for Related Rule 4 (S80: No). Subsequently, since Related Rule 7, as well as Related Rule 4, is associated with Conversion Rule 3 referred to (see FIG. 5A), the CPU 21 determines that not all of Related Rules M have been referred to (i.e., at least one of Related Rules M has not been referred to) (S82: No), and refers to Related Rule 7 next to Related Rule 4 (S79). Then, the CPU 21 determines that the obtained PJL data "MEDIA-SIZE" matches the pre-conversion PJL data "MEDIASIZE" for Related Rule 7 (S80: Yes), and converts the obtained PJL data "MEDIASIZE" into the post-conversion PJL data "PAPER" that is associated with the pre-conversion PJL data "MEDIASIZE" matching the obtained PJL data in Related Rule 7 (S81).

When determining that the conversion rule being referred to is not a conversion rule to which Conversion Mode 2 is applied (S74: No, in FIG. 13), the CPU 21 determines whether the conversion rule being referred to is a conversion rule to which Conversion Mode 3 (i.e., the deletion mode) is applied (S83 in FIG. 14). When determining that the conversion rule being referred to is a conversion rule to which Conversion Mode 3 is applied (S83: Yes), the CPU 21 determines whether the obtained PJL data matches the pre-conversion PJL data for the conversion rule being referred to (S84). When determining that the obtained PJL data matches the pre-conversion PJL data for the conversion rule being referred to (S84: Yes), the CPU 21 deletes the obtained PJL data (S85).

When determining that the conversion rule number N is the conversion rule number indicating the conversion rule at the end of the filter data 13 (S73: Yes), the CPU 21 returns to the main routine. Further, when determining that the indispensable element in the pre-conversion PJL data for the conversion rule being referred to does not match the obtained PJL data (S77: No), the CPU 21 increments the conversion rule number N by "1" (S71) and refers to the conversion rule with the conversion rule number N incremented in S71 (S72), and then executes the steps S73 to S85. Further, when determining that there is not a related rule associated with the conversion rule being referred to (S78: No), the CPU 21 goes back to S76 (see FIG. 13). Namely, if the pre-conversion PJL data for the conversion rule being referred to does not completely match the obtained PJL data (S75: No), but the indispensable element in the pre-conversion PJL data for the conversion rule being referred to matches the obtained PJL data (S77: Yes), it represents that one of the obtained PJL data and the pre-conversion PJL data for the conversion rule being referred to is omitted-type PJL data. Therefore, the CPU 21 converts the obtained PJL data into the post-conversion PJL data that is associated, in the conversion rule being referred to, with the pre-conversion PJL data matching the obtained PJL data (S76). Accordingly, even though the obtained PJL data is omitted-type PJL data, it is possible to convert the obtained PJL data into the post-conversion PJL data.

When determining that the conversion rule being referred to is not a conversion rule to which Conversion Mode 3 (i.e., the deletion mode) is applied (S83: No), or that the obtained PJL data does not match the pre-conversion PJL data for the conversion rule being referred to (S84: No), the CPU 21 increments the conversion rule number N by "1" (S71) and refers to the conversion rule with the conversion rule number N incremented in S71 (S72), and then executes the steps S73 to S85.

As described above, the CPU 21 performs, for each piece of the pre-conversion PJL data associated with the post-conversion PJL data in the filter data 13 stored in the flash ROM 12, a determination process in which, each time the CPU 21 obtains a single piece of PJL data, the CPU 21 determines whether the obtained single piece of PJL data matches one piece of PJL data among the pre-conversion PJL data associated with the post-conversion PJL data in the filter data 13 stored in the flash ROM 12. In addition, when the CPU 21 performs the above determination process for every piece of the pre-conversion PJL data set for each conversion rule, and consequently finds pre-conversion PJL data matching the obtained single piece of PJL data, the CPU 21 performs a conversion process of converting the obtained single piece of PJL data into the post-conversion PJL data associated with the found pre-conversion PJL data in the filter data 1 stored in the flash ROM 12.

Figure 15:
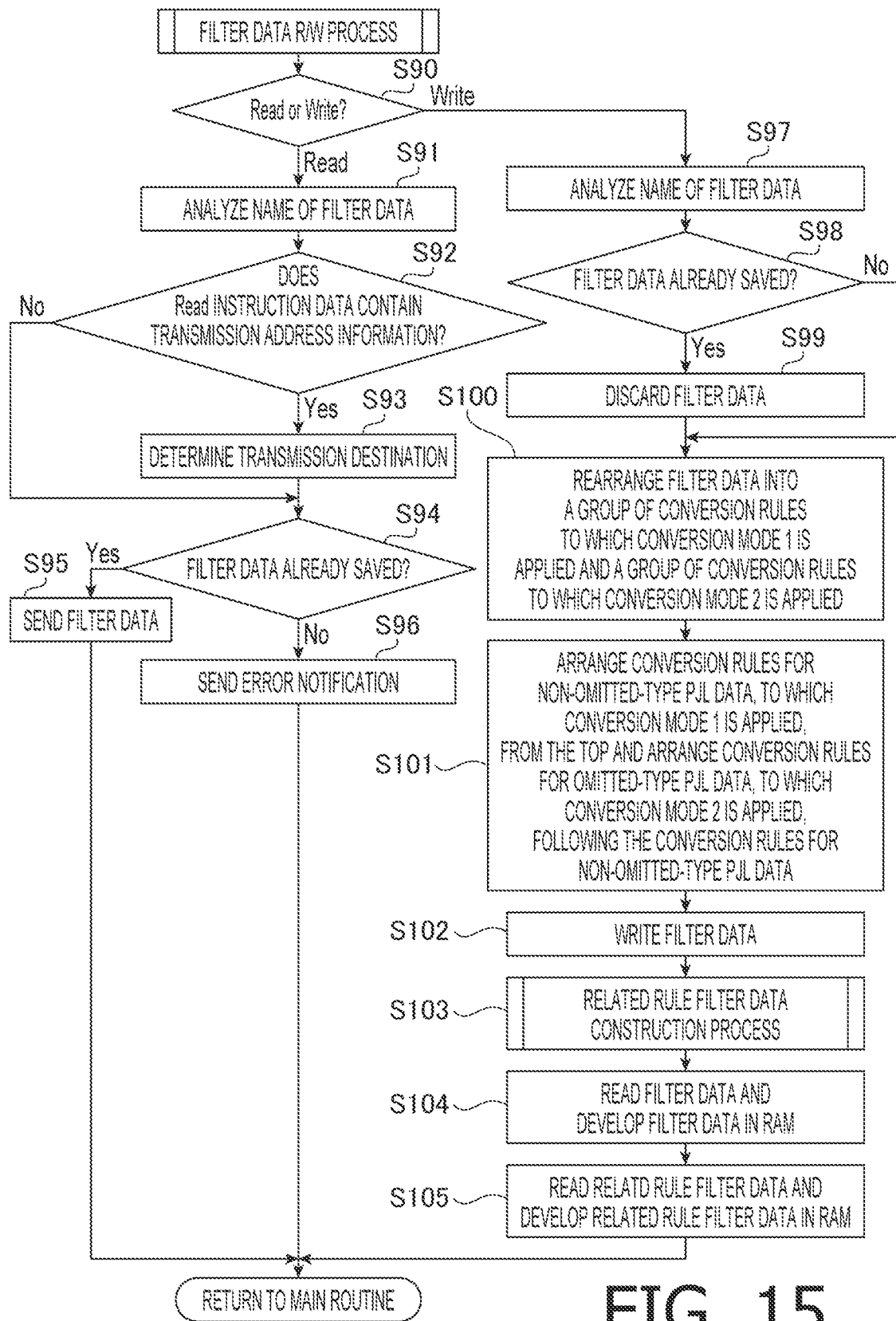
FIG. 15 is a flowchart showing a procedure of a filter data R/W process in the illustrative embodiment according to one or more aspects of the present disclosure.

Next, the filter data R/W process performed by the CPU 21 in S13 (see FIG. 8) of the main routine will be described with reference to FIG. 15. The CPU 21 determines whether the obtained data is Read instruction data to provide an instruction to read the filter data 13 or Write instruction data to provide an instruction to write the filter data 13 (S90). When determining that the obtained data is the Read instruction data (S90: Read), the CPU 21 analyzes a name of the filter data to be read that is indicated by the read instruction data (S91). Then, the CPU 21 determines whether the Read instruction data contains transmission address information indicating a transmission destination (S92).

When determining that the Read instruction data contains the transmission address information indicating the transmission destination (S92: Yes), the CPU 21 determines the transmission destination based on the transmission address information (S93). Then, the CPU 21 determines whether the filter data 13 has already been stored in the flash ROM 12 (S94). When determining that the filter data 13 has already been stored in the flash ROM 12 (S94: Yes), the CPU 21 reads out the filter data 13 from the flash ROM 12 and sends the read filter data 13 to the transmission destination determined in S93 (S95). For instance, when an address of the information processing device 40 (see FIG. 1) is set as the transmission address information in the filter data 13, the CPU 21 sends the filter data 13 read out of the flash ROM 12 to the information processing device 40 via the LAN L1.

When determining that the Read instruction data does not contain the transmission address information indicating the transmission destination (S92: No) and that the filter data 13 has already been stored in the flash ROM 12 (S94: Yes), the CPU 21 sends the filter data 13 to a default transmission destination that is not indicated by the transmission address information (S95). In addition, when determining that the filter data 13 has not been stored in the flash ROM 12 (S94: No), the CPU 21 sends an error notification (S96). For instance, the CPU 21 may send, as the error notification, message data representing "No filter data exists." When the transmission destination is determined in S93, the CPU 21 sends the error notification to the determined transmission destination. Meanwhile, when the transmission destination is not determined, the CPU 21 sends the error notification to the default transmission destination.

When determining that the obtained data is the Write instruction data (S90: Write), the CPU 21 analyzes the name of the filter data to be written that is indicated by the Write instruction data (S97). Then, the CPU 21 determines whether filter data, which has the same name as the name of the filter data to be written, has already been stored in the flash ROM 12 (S98). When determining that filter data, which has the same name as the name of the filter data to be written, has already been stored in the flash ROM 12 (S98: Yes), the CPU 21 discards the filter data 13 stored in the flash ROM 12 (S99). Subsequently, the CPU 21 rearranges (separates) the filter data obtained in S3 (see FIG. 7) of the main routine into a group of the conversion rules to which Conversion Mode 1 is applied and a group of the conversion rules to which Conversion Mode 2 is applied (S100). Further, the CPU 21 arranges the conversion rules for the non-omitted-type PJL data, to which Conversion Mode 1 is applied, from the top of the filter data 13, and arranges the conversion rules for the omitted-type PJL data, to which Conversion Mode 2 is applied, following the conversion rules for the non-omitted-type PJL data (S101). Then, the CPU 21 writes the filter data into the flash ROM 12 (S102). The CPU 21 may set the filter data in a form to be written into the RAM 22. In that form, the filter data written into the RAM 22 disappears when the image forming apparatus 10 is powered off. However, the form is effective in an image forming system in which the image forming apparatus 10 is always powered on or in an image forming system in which the filter data is written each time the image forming apparatus 10 is turned on.

Subsequently, the CPU 21 performs a below-mentioned related rule filter data construction process (S103). Then, the CPU 21 reads the filter data from the flash ROM 12 and develops the read filter data in the RAM 22 (see FIG. 1) (S104). Next, the CPU 21 reads related rule filter data from the flash ROM 12 and develops the read related rule filter data in the RAM 22 (S105). When determining that filter data, which has the same name as the name of the filter data to be written, has not been stored in the flash ROM 12 (S98: No), the CPU 21 executes the steps S100 to S105.

Figure 16:
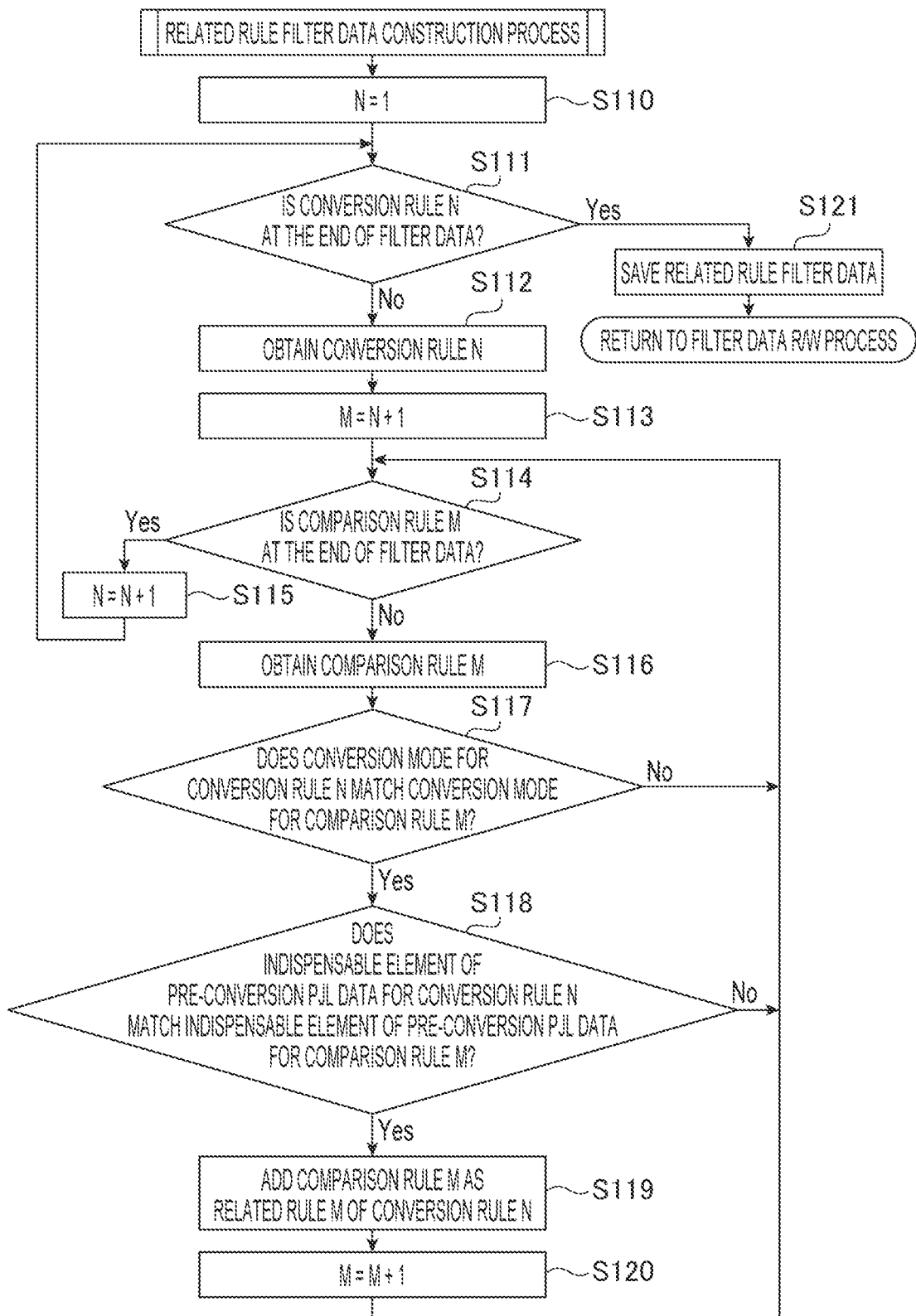
FIG. 16 is a flowchart showing a procedure of a related rule filter data construction process in the illustrative embodiment according to one or more aspects of the present disclosure.

Next, the related rule filter data construction process performed by the CPU 21 in S103 (FIG. 15) of the filter data R/W process will be described with reference to FIG. 16. The CPU 21 sets, to "1," the conversion rule number N of the conversion rule being referred to (S110). The CPU 21 determines whether the conversion rule number N of the conversion rule being referred to is the conversion rule number indicating the conversion rule at the end of the filter data 13 (S111). When determining that the conversion rule number N of the conversion rule being referred to is not the conversion rule number indicating the conversion rule at the end of the filter data 13 (S111: No), the CPU 21 obtains Conversion Rule N from the filter data 13 (see FIG. 5A) (S112).

Subsequently, the CPU 21 sets a value M obtained by adding "1" to the conversion rule number N of Conversion Rule N obtained in S112, to a conversion rule number of Comparison Rule M (S113). The comparison rule is a conversion rule to be compared with Conversion Rule N obtained in S112. For instance, when Conversion Rule N obtained in S112 is Conversion Rule 3 (i.e., N=3), the CPU 21 sets the conversion rule number of Comparison Rule M to "4" (i.e., M=3+1=4) (S113). Then, the CPU 21 determines whether the value M set in S113 is the conversion rule number indicating the conversion rule at the end of the filter data 13 (S114). When determining that the value M set in S113 is not the conversion rule number indicating the conversion rule at the end of the filter data 13 (S114: No), the CPU 21 obtains Comparison Rule M (i.e., the conversion rule with the conversion rule number M) from the filter data 13 (S116).

Subsequently, the CPU 21 determines whether a conversion mode for Conversion Rule N obtained in S112 matches a conversion mode for Comparison Rule M obtained in S116 (S117). When determining that the conversion mode for Conversion Rule N obtained in S112 matches the conversion mode for Comparison Rule M obtained in S116 (S117: Yes), the CPU 21 determines whether an indispensable element of pre-conversion PJL data for Conversion Rule N obtained in S112 matches an indispensable element of pre-conversion PJL data for Comparison Rule M obtained in S116 (S118). When determining that the indispensable element of the pre-conversion PJL data for Conversion Rule N obtained in S112 matches the indispensable element of the pre-conversion PJL data for Comparison Rule M obtained in S116 (S118: Yes), the CPU 21 adds Comparison Rule M obtained in S116 to the filter data 13 as Related Rule M of Conversion Rule N obtained in S112 (S119).

Suppose for instance that Conversion Rule N obtained in S112 is Conversion Rule 3 (i.e., N=3) and that Comparison Rule M is Conversion Rule 4 (i.e., M=4). The respective conversion modes for Conversion Rule 3 and Conversion Rule 4 are Conversion Mode 2 (see FIG. 5A) and match each other (S117: Yes). Further, the respective indispensable elements of the pre-conversion PJL data for Conversion Rule 3 and Conversion Rule 4 are the fourth element "MEDIASIZE" (see FIG. 5A) and match each other (S118: Yes). Therefore, the CPU 21 adds Conversion Rule 4 to the filter data 13 as Related Rule 4 of Conversion Rule 3 (S119). As shown in FIG. 5A, Related Rule 4 is added to the filter data 13 in association with Conversion Rule 3.

Subsequently, the CPU 21 increments the conversion rule number M of Comparison Rule M by "1" (S120), and executes the steps S114 to S120. For instance, when Related Rule M added in S119 of a previous processing routine is Conversion Rule 4, the CPU 21 obtains Conversion Rule 5 with the conversion rule number 5 (=4+1) from the filter data (S116). As shown in FIG. 5A, the conversion mode for Conversion Rule 5 is Conversion Mode 2, which is the same as for Conversion Rule 3. Therefore, the CPU 21 determines that the conversion mode for Conversion Rule 3 obtained in S112 matches the conversion mode for Conversion Rule 5 (S117: Yes). However, the indispensable element of the pre-conversion PJL data for Conversion Rule 5 is the fourth element "MEDIATYPE," which is different from "MEDIASIZE" for Conversion Rule 3. Hence, the CPU 21 determines that the indispensable element of the pre-conversion PJL data for Conversion Rule 3 does not match the indispensable element of the pre-conversion PJL data for Conversion Rule 5 (S118: No). Accordingly, the CPU 21 does not add Conversion Rule 5 to the filter data 13 as the related rule for Conversion Rule 3.

When Conversion Rule 7 is obtained as Comparison Rule M, since the conversion mode for Conversion Rule 7 is Conversion Mode 2, the CPU 21 determines that the conversion mode for Conversion Rule 3 obtained in S112 matches the conversion mode for Conversion Rule 7 (S117: Yes). The indispensable element of the pre-conversion PJL data for Conversion Rule 7 is the fourth element "MEDIASIZE," which is the same as "MEDIASIZE" for Conversion Rule 3. Therefore, the CPU 21 determines that the indispensable element of the pre-conversion PJL data for Conversion Rule 3 matches the indispensable element of the pre-conversion PJL data for Conversion Rule 7 (S118: Yes). Accordingly, the CPU 21 adds Conversion Rule 7 to the filter data 13 as Related Rule 7 of Conversion Rule 3 (S119). As shown in FIG. 5A, Related Rule 7 is added to the filter data 13 in association with Conversion Rule 3.

When determining that the value M set in S113 is the conversion rule number indicating the conversion rule at the end of the filter data 13 (S114: Yes), the CPU 21 increments the conversion rule number N by "1" (S115), and constructs the related rule filter data for the conversion rule with the conversion rule number N incremented in S115. Then, when determining that the conversion rule number N (after incremented in S115) of the conversion rule being referred to is not the conversion rule number indicating the conversion rule at the end of the filter data 13 (S111: No), the CPU 21 obtains the conversion rule with the conversion rule number N from the filter data (S112). Subsequently, the CPU 21 sets the value obtained by adding "1" to the conversion rule number N (after incremented in S115) of the conversion rule N obtained in S112 to the conversion rule number of the comparison rule M (S113). Thereafter, the CPU 21 executes the aforementioned steps S114 to S120. When there exists a comparison rule M related to the conversion rule with the conversion rule number N (after incremented in S115), the CPU 21 adds the comparison rule M to the filter data 13 as a related rule M of the conversion rule with the conversion rule number N (S119).

Namely, the CPU 21 executes S111 to S120 for each of the conversion rules included in the filter data 13. When there exists a comparison rule related to a specific conversion rule, the CPU 21 adds the comparison rule to the filter data 13 as a related rule of the specific conversion rule. When determining that the conversion rule number N of the conversion rule being referred to is the conversion rule number indicating the conversion rule at the end of the filter data 13 (S111: Yes), the CPU 21 stores, into the flash ROM 12, the related rule filter data indicating the related rule added in S119 (S121). Afterwards, the CPU 21 returns to the filter data R/W process (see FIG. 15).

[Advantageous Effects of Illustrative Embodiment]

According to the aforementioned illustrative embodiment, when determining that the additional post-conversion PJL data exists in the filter data 13 (S15: Yes), the CPU 21 obtains the additional post-conversion PJL data from the filter data 13 and adds the obtained additional post-conversion PJL data to the data that has already been obtained by the CPU 21 (S16 in FIG. 8). Therefore, according to the aforementioned illustrative embodiment, even when a new function is added to the image forming apparatus 10, the information processing device 40 that sends the print job 30 to the image forming apparatus 10 may cause the image forming apparatus 10 to execute the new function even without sending to the image forming apparatus 10 post-conversion PJL data for instructing the image forming apparatus 10 to execute the new function. Namely, according to the aforementioned illustrative embodiment, there is no need to reconstruct the image forming system including the information processing device 40 and the image forming apparatus 10. Hence, it is possible to prevent an increase in burden on the administrator.

In addition, according to the aforementioned illustrative embodiment, even if the PJL data obtained from the information processing device 40 is PJL data used for an image forming apparatus different from the image forming apparatus 10 and inexecutable by the image forming apparatus 10, it is possible to convert the PJL data into PJL data executable by the image forming apparatus 10. Therefore, the administrator of the image forming system including the information processing device 40 and the image forming apparatus 10 needs not newly regenerate PJL data compliant to the specifications of the image forming apparatus 10 instead of the PJL data used until the image forming apparatus has been updated to the image forming apparatus 10.

Further, according to the aforementioned illustrative embodiment, it is possible to read out the filter data 13 from the flash ROM 12 and output the read filter data 13. Therefore, for instance, it is possible to edit the output filter data 13. Further, according to the aforementioned illustrative embodiment, it is possible to read out the filter data 13 from the flash ROM 12 and send the read filter data 13 to a particular transmission destination. Therefore, for instance, it is possible to use the filter data 13 in the image forming apparatus 10 that is the particular transmission destination.

Further, according to the aforementioned illustrative embodiment, the CPU 21 is enabled to convert the obtained PJL data into the post-conversion PJL data, regardless of whether the obtained PJL data is non-omitted-type PJL data or omitted-type PJL data. Further, according to the aforementioned illustrative embodiment, the CPU 21 is enabled to write the filter data 13 in the flash ROM 12 in such a manner that the conversion rules for the non-omitted-type PJL data to which Conversion Mode 1 is applied are arranged from the top of the filter data 13 and that the conversion rules for the omitted-type PJL data to which Conversion Mode 2 is applied are arranged following the conversion rules for the non-omitted-type PJL data. Therefore, when the PJL data obtained by the CPU 21 is non-omitted-type PJL data, there is no risk that the obtained PJL data might be mistakenly converted into omitted-type PJL data.

Further, according to the aforementioned illustrative embodiment, when determining that the pre-conversion PJL data for the conversion rule being currently referred to does not include PJL data that does not match the obtained PJL data (S53: No), the CPU 21 converts the obtained PJL data into post-conversion PJL data associated with the pre-conversion PJL data in the conversion rule being currently referred to (S58). Then, the CPU 21 terminates the determination process of determining whether the obtained PJL data matches the pre-conversion PJL data for the conversion rule being currently referred to. Accordingly, it is possible to increase the conversion speed for converting the obtained PJL data into the post-conversion PJL data associated with the said pre-conversion PJL data in the conversion rule.

Further, according to the aforementioned illustrative embodiment, the CPU 21 makes the determination as to whether the pre-conversion PJL data for an individual conversion rule matches the obtained PJL data, in the order from the top (i.e., Conversion Rule 1) to the end (i.e., Conversion Rule 10) of the filter data 13. However, when determining that the pre-conversion PJL data for the conversion rule being referred to does not completely match the obtained PJL data, if an index of a related rule is associated with the conversion rule being referred to, the CPU 21 skips to the conversion rule (i.e., the related rule) indicated by the index, and determines whether the pre-conversion PJL data for the conversion rule (i.e., the related rule) indicated by the index matches the obtained PJL data. Namely, based on the index associated with the conversion rule being referred to, the CPU 21 may skip the target conversion rule to be referred to, from the conversion rule currently referred to, to the conversion rule (i.e., the related rule) indicated by the index. Therefore, it is possible to make shorter the search time required to find the conversion rule for which the pre-conversion PJL data matches the obtained PJL data than when the determination as to whether the pre-conversion PJL data for an individual conversion rule matches the obtained PJL data is made in the order from Conversion Rule 1 to Conversion Rule 10. Accordingly, it is possible to increase the conversion speed as the search time is reduced.

Further, according to the aforementioned illustrative embodiment, when the image forming apparatus, before updated to the image forming apparatus 10, needs to obtain L (L≥2) pieces of PJL data to perform a single process, but the image forming apparatus 10, after the said image forming apparatus has been updated thereto, only needs to obtain K (K<L) pieces of PJL data to perform the same single process, the image forming apparatus 10 performs the obtained-PJL-data conversion process (see FIG. 11), thereby converting the obtained L pieces of PJL data into K pieces of post-conversion PJL data.

Further, according to the aforementioned illustrative embodiment, when the image forming apparatus, before updated to the image forming apparatus 10, needs to obtain PJL data including L (L≥2) pieces of data to perform a single process, but the image forming apparatus 10, after the said image forming apparatus has been updated thereto, only needs to obtain PJL data including K (K<L) pieces of data to perform the same single process, the image forming apparatus 10 may convert pre-conversion PJL data including L pieces of data into post-conversion PJL data including K pieces of data.

Furthermore, according to the aforementioned illustrative embodiment, when the image forming apparatus, before updated to the image forming apparatus 10, only needs to obtain PJL data including K (K<L) pieces of data to perform a single process, but the image forming apparatus 10, after the said image forming apparatus has been updated thereto, needs to obtain PJL data including L (L≥2) pieces of data to perform the same single process, the image forming apparatus 10 may convert pre-conversion PJL data including K pieces of data into post-conversion PJL data including L pieces of data.

Further, according to the aforementioned illustrative embodiment, when the PJL data obtained by the CPU 21 is PJL data to which Conversion Mode 1 is applied and matches only one of a plurality of pre-conversion PJL data for the conversion rule referred to, the CPU 21 may perform the already-obtained-data search process to search for the PJL data (i.e., the non-matching PJL data) that does not match the obtained PJL data, from among the PJL data that has already been obtained. Then, when the non-matching PJL data is found in the already-obtained-data search process, the CPU 21 may convert pre-conversion PJL data, which is equivalent to PJL data resulting from combining the found non-matching PJL data and the PJL data determined to match the obtained PJL data, into the post-conversion PJL data associated with the said pre-conversion PJL data in the conversion rule referred to. Namely, according to the aforementioned illustrative embodiment, when the image forming apparatus, before updated to the image forming apparatus 10, needs two pieces of PJL data to which Conversion Mode 1 is applied to perform a single process, but the image forming apparatus 10, after the image forming apparatus has been updated thereto, needs only one piece of PJL data to which Conversion Mode 1 is applied to perform the same single process, if one of the above two pieces of PJL data is obtained, the image forming apparatus 10 may perform the already-obtained-data search process, thereby searching for and finding the other one of the above two pieces of PJL data from among the PJL data that has already been obtained. Therefore, it is possible to accurately convert the obtained two pieces of PJL data.

Further, according to the aforementioned illustrative embodiment, the CPU 21 performs the PJL data conversion process (S7) and thereafter performs the printing process (S18). Therefore, the instructions indicated by the PJL data converted through the PJL data conversion process are reflected in the printing process.

Furthermore, according to the aforementioned illustrative embodiment, the filter data 13 associates the pre-conversion PJL data with the post-conversion PJL data that provides an instruction to change the settings for the printing function. Therefore, it is possible to change the settings for the printing function, even without changing the PJL data used in the image forming apparatus before updated to the image forming apparatus 10.

Further, according to the aforementioned illustrative embodiment, when determining that Conversion Rule N being currently referred to is a conversion rule to which Conversion Mode 3 is applied (S37: Yes, in FIG. 10), the CPU 21 determines whether the pre-conversion PJL data for Conversion Rule N being currently referred to matches the obtained PJL data (S38). When determining that the pre-conversion PJL data for Conversion Rule N being currently referred to matches the obtained PJL data (S38: Yes), the CPU 21 deletes the obtained PJL data (S39). Thus, according to the aforementioned illustrative embodiment, the CPU 21 does not perform a process of converting the obtained PJL data that matches the deleted PJL data into the post-conversion PJL data. Namely, the CPU 21 does not perform the process specified by the obtained PJL data.

Figure 8:
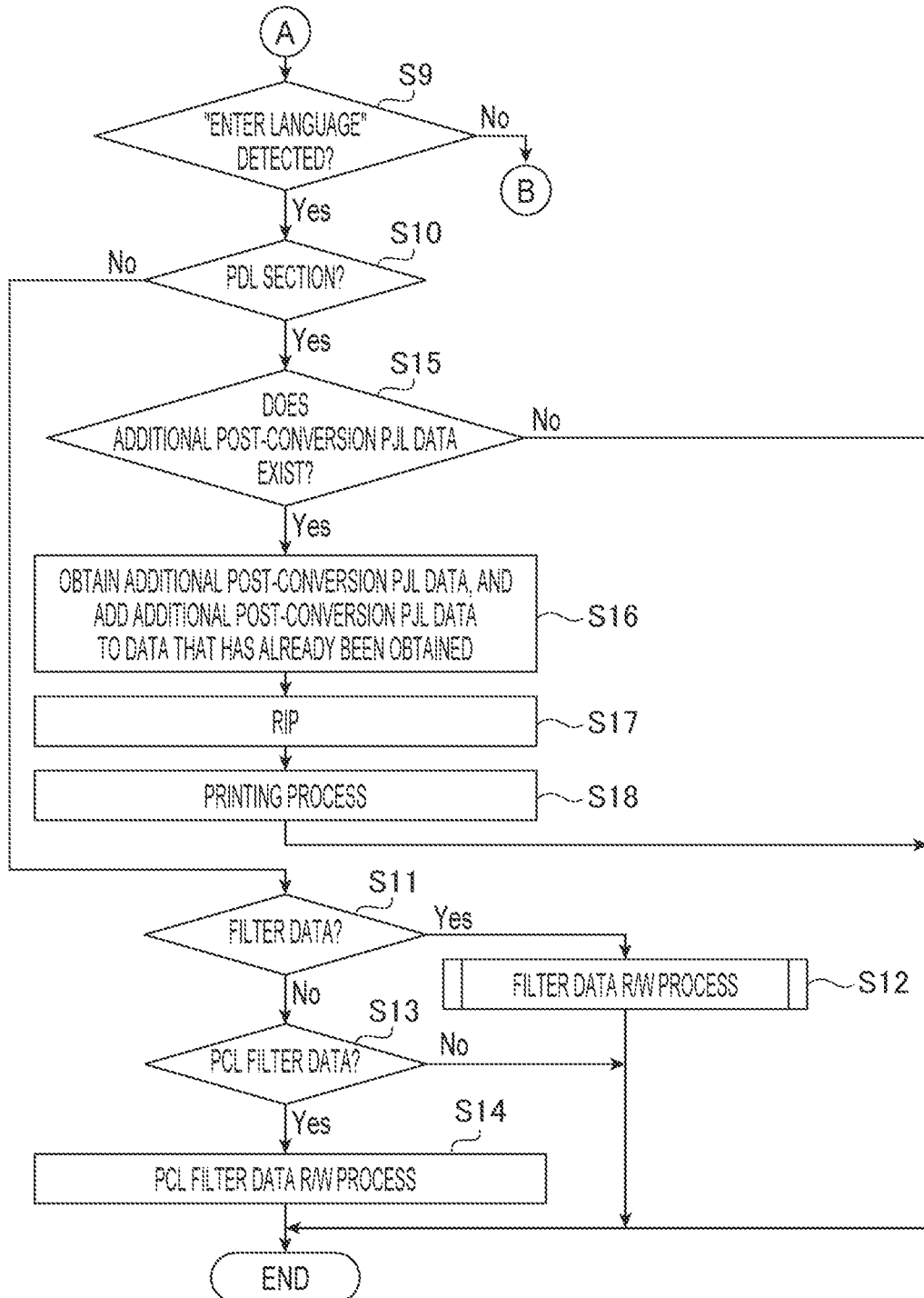

Further, according to the aforementioned illustrative embodiment, the CPU 21 may obtain PCL filter data, and may perform a process of writing the obtained PCL filter data into the flash ROM 12 and a process of reading out the PCL filter data from the flash ROM 12 (S14 in FIG. 8). Thus, according to the aforementioned illustrative embodiment, when the image forming apparatus 10 uses the PCL as the page description language (PDL), even if PCL data received from the information processing device 40 is data (e.g., a different version of PCL data) un-processable by the image forming apparatus 10, the image forming apparatus 10 may convert the received PCL data by using the PCL filter.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

[Modifications]

When the obtained filter data is edited filter data, the CPU 21 may store the edited filter data in the flash ROM 12. Then, when the obtained PJL data is pre-conversion PJL data that is associated with post-conversion PJL data in the edited filter data stored in the flash ROM 12, the CPU 21 may convert the obtained PJL data into the post-conversion PJL data that is associated with the pre-conversion PJL data in the edited filter data stored in the flash ROM 12. According to this modification, even when the image forming apparatus is updated such that functions and capabilities thereof are added or deleted, it is possible to address the added or deleted functions and capabilities by editing the filter data.

A plurality of types of filter data may be stored in the flash ROM 12. When the CPU 21 accepts, via the user I/F 16 (see FIG. 1), an operation to specify filter data from among the plurality of types of filter data stored in the flash ROM 12, and the obtained PJL data is pre-conversion PJL data associated with post-conversion PJL data in the specified filter data, the CPU 21 may convert the obtained PJL data into the post-conversion PJL data associated with the pre-conversion PJL data in the specified filter data. According to this modification, the user is allowed to select and use necessary filter data.

When writing the obtained filter data into the flash ROM 12 (S102 in FIG. 15), the CPU 21 may sort the pre-conversion PJL data associated with the post-conversion PJL data in the obtained filter data and then write the filter data into the flash ROM 12. The sorting method is not limited, but for instance, the pre-conversion PJL data may be sorted in such a manner that respective first characters of the individual pieces of pre-conversion PJL data are arranged in alphabetical order. Then, when searching for the pre-conversion PJL data that matches the obtained PJL data, the CPU 21 may narrow down the pre-conversion PJL data in a binary search method and then search for the pre-conversion PJL data matching the obtained PJL data. According to this modification, it is possible to increase a determination processing speed of the CPU 21. Therefore, it is possible to increase the conversion speed for converting the obtained PJL data into the post-conversion PJL data.

The CPU 21 may obtain filter data for additional information notification. The filter data for additional information notification is filter data for associating pre-conversion PJL data with post-conversion PJL data that instructs notification of additional information (e.g., a user name and a print job name) regarding the printing process (S18 in FIG. 8). Then, the CPU 21 may store the obtained filter data for additional information notification into the flash ROM 12. Further, when the post-conversion PJL data obtained through the conversion process (see S58 in FIG. 11, S76 in FIG. 13, and S81 in FIG. 14) is the post-conversion PJL data in the filter data for additional information notification as stored in the flash ROM 12, the CPU 21 may perform an additional information notification process to provide a notification of the additional information regarding the printing process. According to this modification, it is possible to provide the notification of the additional information, even without changing the pre-conversion PJL data used until the image forming apparatus is updated to the image forming apparatus 10.

In the aforementioned illustrative embodiment, the CPU 21 obtains the PCL filter data as another type of filter data for converting data in a format different from the PJL data into data processable by the image forming apparatus 10. However, the CPU 21 may obtain yet another type of filter data for converting data (e.g., PS data) other than the PCL data into data processable by the image forming apparatus 10. Then, the CPU 21 may store the obtained yet another type of filter data into the flash ROM 12. When obtaining data other than the PCL data, the CPU 21 may convert the obtained data into data processable by the image forming apparatus 10 based on the yet another type of filter data stored in the flash ROM 12. According to this modification, when the image forming apparatus has been updated to the image forming apparatus 10, even if the CPU 21 obtains data which is in a format different from the PJL data and which is used until the image forming apparatus has been updated to the image forming apparatus 10, it is possible to convert the obtained data into data processable by the image forming apparatus 10.

The program according to aspects of the present disclosure may be obtained from the Web or from a storage medium such as USB memory or a CD-ROM. Further, the program according to aspects of the present disclosure may be obtained by communicating with another image forming apparatus or another information processing device that stores the program.

The following shows examples of associations between elements exemplified in the aforementioned illustrative embodiments and modifications and elements according to aspects of the present disclosure. The image forming system 1 may be an example of an "image forming system" according to aspects of the present disclosure. The image forming apparatus 10 may be an example of an "image forming apparatus" according to aspects of the present disclosure. The information processing device 40 may be an example of an "information processing device" according to aspects of the present disclosure. The controller 20 may be an example of a "controller" according to aspects of the present disclosure. The CPU 21 may be an example of a "processor" according to aspects of the present disclosure. The ROM 23 storing the program 24 may be an example of a "non-transitory computer-readable medium storing computer-readable instructions" according to aspects of the present disclosure. The CPU 21 and the ROM 23 storing the program 24 may be included in the "controller" according to aspects of the present disclosure. The flash ROM 12 may be an example of a "non-volatile memory" according to aspects of the present disclosure. The communication I/F 17 and the USB I/F 18 may be included in a "data interface" according to aspects of the present disclosure. The user I/F 16 may be an example of a "user interface" according to aspects of the present disclosure. The PDL section 32 may be an example of "print data" according to aspects of the present disclosure. The pre-conversion PJL data may be an example of "non-target PJL data" according to aspects of the present disclosure. The post-conversion PJL data may be an example of "target PJL data" according to aspects of the present disclosure. The PCL data may be an example of "data in a different format (from the PJL data)" according to aspects of the present disclosure.

What is claimed is:

1. An image forming apparatus comprising:
   a data interface;
   a non-volatile memory; and
   a controller configured to:
   obtain Printer Job Language (PJL) data via the data interface;
   determine whether filter data stored in the non-volatile memory includes target PJL data to be added to the obtained PJL data, the filter data containing description of conversion rules for converting the obtained PJL data into PJL data executable by the image forming apparatus; and
   in response to determining that the filter data stored in the non-volatile memory includes the target PJL to be added to the obtained PJL data, obtain the target PJL data included in the filter data as additional target PJL data, and add the additional target PJL data to the obtained PJL data, the target PJL data being PJL data intended for causing the image forming apparatus to perform a particular process.

2. The image forming apparatus according to claim 1,
wherein the controller is further configured to, when the image forming apparatus is booted, read the filter data from the non-volatile memory, and develop the read filter data in a volatile memory.

3. The image forming apparatus according to claim 1,
wherein the controller is further configured to:
when print data is obtained as well as the obtained PJL data, add the additional target PJL data to the obtained PJL data; and
when the additional target PJL data is PJL data providing an instruction to change settings for a printing function, change the settings for the printing function in accordance with the instruction provided by the additional target PJL data, and perform a printing process based on the obtained print data and the printing function for which the settings have been changed.

4. The image forming apparatus according to claim 3,
wherein the controller is further configured to, when the additional target PJL data is PJL data instructing notification of additional information regarding the printing process, provide a notification of the additional information regarding the printing process.

5. The image forming apparatus according to claim 1, further comprising a user interface,
wherein the non-volatile memory is configured to store a plurality of types of filter data including the said filter data, and
wherein the controller is further configured to receive, via the user interface, an operation to specify filter data from among the plurality of types of filter data stored in the non-volatile memory.

6. The image forming apparatus according to claim 1,
wherein the controller is further configured to:
based on the filter data stored in the non-volatile memory, determine whether the obtained PJL data is non-target PJL data to be converted into corresponding target PJL data, the non-target PJL data being PJL data not intended for causing the image forming apparatus to perform the particular process;
when determining that the obtained PJL data is the non-target PJL data to be converted, convert the obtained PJL data into the corresponding target PJL data; and
add the additional target PJL data included in the filter data to the converted PJL data.

7. The image forming apparatus according to claim 6,
wherein the filter data stored in the non-volatile memory further includes data for associating the non-target PJL data with the corresponding target PJL data, and
wherein the controller is further configured to, when the obtained PJL data is the non-target PJL data associated with the corresponding target PJL data in the filter data stored in the non-volatile memory, determine that the obtained PJL data is the non-target PJL data to be converted into the corresponding target PJL data, convert the obtained PJL data into the corresponding target PJL data associated with the non-target PJL data in the filter data and add the additional target PJL data included in the filter data to the converted PJL data.

8. The image forming apparatus according to claim 7,
wherein PJL data obtainable by the controller includes:
non-omitted-type PJL data with no elements omitted; and
omitted-type PJL data with at least one element omitted,
wherein the filter data includes a plurality of pieces of non-target PJL data associated with a plurality of pieces of PJL data, the plurality of pieces of PJL data including:
first target PJL data associated with the non-omitted-type PJL data; and
second target PJL data associated with the omitted-type PJL data, and
wherein the controller is further configured to:
when the obtained PJL data is the non-target PJL data associated with the corresponding target PJL data in the filter data stored in the non-volatile memory and is the non-omitted-type PJL data, convert the obtained PJL data into the first target PJL data associated with the non-omitted-type PJL data in the filter data stored in the non-volatile memory; and
when the obtained PJL data is the non-target PJL data associated with the corresponding target PJL data in the filter data stored in the non-volatile memory and is the omitted-type PJL data, convert the obtained PJL data into the second target PJL data associated with the omitted-type PJL data in the filter data stored in the non-volatile memory.

9. The image forming apparatus according to claim 8,
wherein the controller is further configured to determine whether the obtained PJL data matches at least a part of one piece of non-target PJL data among the plurality of pieces of non-target PJL data associated with the plurality of pieces of target PJL data in the filter data stored in the non-volatile memory, for each of the plurality of pieces of non-target PJL data, and
wherein the filter data is further configured in such a manner that determination as to whether the obtained PJL data matches at least a part of the non-omitted-type PJL data associated with the first target PJL data in the filter data stored in the non-volatile memory is made in priority to determination as to whether the obtained PJL data matches at least a part of the omitted-type PJL data associated with the second target PJL data in the filter data.

10. The image forming apparatus according to claim 9,
wherein the controller is further configured to, before converting the obtained PJL data, rearrange the filter data in such a manner that the determination as to whether the obtained PJL data matches at least a part of the non-omitted-type PJL data associated with the first target PJL data in the filter data stored in the non-volatile memory is made in priority to the determination as to whether the obtained PJL data matches at least a part of the omitted-type PJL data associated with the second target PJL data in the filter data.

11. The image forming apparatus according to claim 9,
wherein the controller is further configured to, when determining that there exists non-target PJL data matching the obtained PJL data in the filter data stored in the non-volatile memory, terminate the determination for each of the plurality of pieces of non-target PJL data as to whether the obtained PJL data matches at least a part of one piece of non-target PJL data among the plurality of pieces of non-target PJL data associated with the plurality of pieces of target PJL data in the filter data stored in the non-volatile memory.

12. The image forming apparatus according to claim 9,
wherein the filter data stored in the non-volatile memory includes:
related non-target PJL data having data related to non-target PJL data; and related target PJL data associated with the related non-target PJL data, wherein the controller is further configured to:

when determining that the obtained PJL data does not match a piece of non-target PJL data among the plurality of pieces of non-target PJL data associated with the plurality of pieces of target PJL data in the filter data, determine whether the obtained PJL data matches specific related non-target PJL data having data related to the said piece of non-target PJL data; and when determining that the obtained PJL data matches the specific related non-target PJL data having the data related to the said piece of non-target PJL data, convert the obtained PJL data into related target PJL data associated with the specific related non-target PJL data in the filter data stored in the non-volatile memory.

13. The image forming apparatus according to claim 12, wherein the controller is further configured to:

store the filter data in the non-volatile memory, with an index being associated with each of the plurality of pieces of non-target PJL data associated with the plurality of pieces of target PJL data in the filter data;

when determining that the obtained PJL data does not match a piece of non-target PJL data among the plurality of pieces of non-target PJL data associated with the plurality of pieces of target PJL data in the filter data, search for related non-target PJL data having data related to the said piece of non-target PJL data, based on the index associated with the said piece of non-target PJL data, and determine whether the obtained PJL data matches the related non-target PJL data found in the searching; and when determining that the obtained PJL data matches the found related non-target PJL data, convert the obtained PJL data into related target PJL data associated with the found related non-target PJL data in the filter data stored in the non-volatile memory.

14. The image forming apparatus according to claim 9, wherein the filter data includes L (L≥2) pieces of non-target PJL data associated with K (K<L) pieces of target PJL data, and wherein the controller is further configured to:

obtain L pieces of PJL data via the data interface, separately L times in a one piece-by-one piece basis;

each time a single piece of PJL data is obtained, determine which, of the L pieces of non-target PJL data associated with the K pieces of target PJL data in the filter data stored in the non-volatile memory, matches the obtained single piece of PJL data, for each of the L pieces of non-target PJL data associated with the K pieces of target PJL data in the filter data, thereby searching for a corresponding one of the L pieces of non-target PJL data that matches each of the obtained L pieces of PJL data; and when the corresponding one of the L pieces of non-target PJL data is found that matches each of the obtained L pieces of PJL data, convert the obtained L pieces of PJL data into the K pieces of target PJL data associated with the L pieces of non-target PJL data in the filter data stored in the non-volatile memory.

15. The image forming apparatus according to claim 9, wherein the filter data includes one or more pieces of non-target PJL data each of which includes L (L≥2) pieces of data and is associated with corresponding target PJL data including K (K<L) pieces of data, and wherein the controller is further configured to:

when the obtained PJL data includes L pieces of data, determine whether the obtained PJL data matches one piece of non-target PJL data among the one or more pieces of non-target PJL data each of which includes L pieces of data and is associated with the corresponding target PJL data including K pieces of data in the filter data stored in the non-volatile memory; and when determining that the obtained PJL data including L pieces of data matches one piece of non-target PJL data among the one or more pieces of non-target PJL data each of which includes L pieces of data and is associated with the corresponding target PJL data including K pieces of data in the filter data stored in the non-volatile memory, convert the obtained PJL data including L pieces of data into the corresponding target PJL data that includes K pieces of data and is associated with the said one piece of non-target PJL data including L pieces of data in the filter data stored in the non-volatile memory.

16. The image forming apparatus according to claim 9, wherein the filter data includes one or more pieces of non-target PJL data each of which includes K (K<L) pieces of data and is associated with corresponding target PJL data including L (L≥2) pieces of data, and wherein the controller is further configured to:

when the obtained PJL data includes K pieces of data, determine whether the obtained PJL data matches one piece of non-target PJL data among the one or more pieces of non-target PJL data each of which includes K pieces of data and is associated with the corresponding target PJL data including L pieces of data in the filter data stored in the non-volatile memory; and when determining that the obtained PJL data including K pieces of data matches one piece of non-target PJL data among the one or more pieces of non-target PJL data each of which includes K pieces of data and is associated with the corresponding target PJL data including L pieces of data in the filter data stored in the non-volatile memory, convert the obtained PJL data including K pieces of data into the corresponding target PJL data that includes L pieces of data and is associated with the said one piece of non-target PJL data including K pieces of data in the filter data stored in the non-volatile memory.

17. The image forming apparatus according to claim 9, wherein the plurality of pieces of non-target PJL data, associated with the plurality of pieces of target PJL data in the filter data stored in the non-volatile memory, are sorted, and wherein the controller is further configured to narrow down the sorted plurality of pieces of non-target PJL data in a binary search method, thereby searching for non-target PJL data matching the obtained PJL data.

18. An image forming system comprising:
an information processing device; and
an image forming apparatus comprising:
 a data interface;
 a non-volatile memory; and
 a controller configured to:
  obtain Printer Job Language (PJL) data via the data interface;

determine whether filter data stored in the non-volatile memory includes target PJL data to be added to the obtained PJL data, the filter data containing description of conversion rules for converting the obtained PJL data into PJL data executable by the image forming apparatus; and in response to determining that the filter data stored in the non-volatile memory includes the target PJL to be added to the obtained PJL data, obtain the target PJL data included in the filter data as additional target PJL data, and add the additional target PJL data to the obtained PJL data, the target PJL data being PJL data intended for causing the image forming apparatus to perform a particular process.

19. A non-transitory computer-readable medium storing computer-readable instructions executable by a processor of an image forming apparatus comprising a data interface and a non-volatile memory, the instructions being configured to, when executed by the processor, cause the image forming apparatus to:

obtain Printer Job Language (PJL) data via the data interface;

determine whether filter data stored in the non-volatile memory includes target PJL data to be added to the obtained PJL data, the filter data containing description of conversion rules for converting the obtained PJL data into PJL data executable by the image forming apparatus; and in response to determining that the filter data stored in the non-volatile memory includes the target PJL to be added to the obtained PJL data, obtain the target PJL data included in the filter data as additional target PJL data, and add the additional target PJL data to the obtained PJL data, the target PJL data being PJL data intended for causing the image forming apparatus to perform a particular process.

* * * * *

UNITED STATES PATENT AND TRADEMARK OFFICE
CERTIFICATE OF CORRECTION

PATENT NO. : 11,593,040 B2
APPLICATION NO. : 17/411481
DATED : February 28, 2023
INVENTOR(S) : Yoshihiro Itogawa It is certified that error appears in the above-identified patent and that said Letters Patent is hereby corrected as shown below:

In the Drawings

Sheet 3 of 16 the label for FIG. 3 should be inserted, as shown on the attached page In the Claims Column 36, Lines 11 and 12 should read:
apparatus; and
    in response to determining that the filter data stored in the non-volatile memory includes the Signed and Sealed this
Twentieth Day of May, 2025

Coke Morgan Stewart
*Acting Director of the United States Patent and Trademark Office*

Conversion Modes 1-4

| Conversion Mode | Conversion Target | Indispensable/Omittable/Unnecessary in Conversion Rule Setting for Each Section of PJL Data | | | Related Rule |
|---|---|---|---|---|---|
| | | Command | Command modifier Value | Option name Value | |
| 1 | Command | Indispensable | Unnecessary | Unnecessary | Skip to 100th line |
| 2 | Option name | Omittable | Omittable | Indispensable | Skip to 299th line |
| 3 | PJL data deletion | Omittable | Omittable | Omittable | |
| 4 | PJL data addition | Indispensable | Omittable | Indispensable | |

FIG. 3